(12) United States Patent
Hosseini

(10) Patent No.: US 10,017,410 B2
(45) Date of Patent: Jul. 10, 2018

(54) METHOD OF FABRICATING A GLASS MAGNETIC HARD DRIVE DISK PLATTER USING FILAMENTATION BY BURST ULTRAFAST LASER PULSES

(71) Applicant: ROFIN-SINAR TECHNOLOGIES INC., Plymouth, MI (US)

(72) Inventor: S. Abbas Hosseini, Orlando, FL (US)

(73) Assignee: ROFIN-SINAR TECHNOLOGIES LLC, Plymouth, MI (US)

( * ) Notice: Subject to any disclaimer, the term of this patent is extended or adjusted under 35 U.S.C. 154(b) by 0 days.

(21) Appl. No.: 14/512,180

(22) Filed: Oct. 10, 2014

(65) Prior Publication Data

US 2015/0118522 A1    Apr. 30, 2015

Related U.S. Application Data

(60) Provisional application No. 61/895,921, filed on Oct. 25, 2013.

(51) Int. Cl.
*C03B 33/023* (2006.01)
*C03B 33/09* (2006.01)
(Continued)

(52) U.S. Cl.
CPC ........ *C03B 33/091* (2013.01); *B23K 26/0617* (2013.01); *B23K 26/0622* (2015.10);
(Continued)

(58) Field of Classification Search
CPC .............................. B23K 26/00; C03B 33/00
See application file for complete search history.

(56) References Cited

U.S. PATENT DOCUMENTS

| 5,107,510 A | 4/1992 | Seguin et al. |
| 6,084,897 A | 7/2000 | Wakabayashi et al. |

(Continued)

FOREIGN PATENT DOCUMENTS

| CA | 2332154 | 9/2009 |
| CA | 2907757 | 9/2014 |

(Continued)

OTHER PUBLICATIONS

Migliore et al., Advances in Laser Singulation of Silicon, Paper #770, pp. 1-6, Coherent, Inc., Santa Clara, CA, USA; HBL Corporation, Daejeon 305-811 Korea.

(Continued)

*Primary Examiner* — Cynthia Szewczyk
(74) *Attorney, Agent, or Firm* — Woodling, Krost and Rust

(57) ABSTRACT

A non-ablative method and apparatus for making an economical glass hard disk (platter) for a computer hard disk drive (HDD) using a material machining technique involving filamentation by burst ultrafast laser pulses. Two related methods disclosed, differing only in whether the glass substrate the HDD platter is to be cut from has been coated with all the necessary material layers to function as a magnetic media in a computer's hard drive. Platter blanks are precisely cut using filamentation by burst ultrafast laser pulses such that the blank's edges need not be ground, the platter's geometric circularity need not be corrected and there is no need for further surface polishing. Thus the platters can be cut from raw glass or coated glass. As a result, this method reduces the product contamination, speeds up production, and realizes great reductions in the quantity of waste materials and lower production costs.

8 Claims, 27 Drawing Sheets

(51) Int. Cl.
*G11B 5/84* (2006.01)
*C03B 33/02* (2006.01)
*B23K 26/06* (2014.01)
*B23K 26/0622* (2014.01)
*C03B 33/04* (2006.01)
*B23K 103/00* (2006.01)

(52) U.S. Cl.
CPC ........ *C03B 33/0222* (2013.01); *G11B 5/8404* (2013.01); *B23K 2203/54* (2015.10); *C03B 33/04* (2013.01); *Y02P 40/57* (2015.11)

(56) References Cited

U.S. PATENT DOCUMENTS

| | | | |
|---|---|---|---|
| 6,407,360 | B1 | 6/2002 | Choo et al. |
| 6,552,301 | B2 | 4/2003 | Herman et al. |
| 6,596,613 | B1 * | 7/2003 | Kusumoto ............. B23K 26/06 257/E21.134 |
| 6,787,732 | B1 * | 9/2004 | Xuan ................ B23K 26/0057 219/121.67 |
| 7,033,519 | B2 | 4/2006 | Taylor et al. |
| 7,211,184 | B2 | 5/2007 | Webster et al. |
| 7,303,977 | B2 | 12/2007 | Voronov et al. |
| 7,605,344 | B2 | 10/2009 | Fukumitsu |
| 7,626,138 | B2 | 12/2009 | Bovatsek et al. |
| 8,097,830 | B2 | 1/2012 | Woeste et al. |
| 8,842,358 | B2 | 9/2014 | Bareman et al. |
| 8,852,698 | B2 | 10/2014 | Fukumitsu |
| 9,102,007 | B2 | 8/2015 | Hosseini |
| 9,102,011 | B2 | 8/2015 | Hosseini |
| 2002/0001321 | A1 * | 1/2002 | Perry .................... B23K 26/12 372/22 |
| 2002/0125232 | A1 | 9/2002 | Choo et al. |
| 2003/0006221 | A1 | 1/2003 | Hong et al. |
| 2004/0017428 | A1 | 1/2004 | Cronin et al. |
| 2005/0272223 | A1 | 12/2005 | Fujii et al. |
| 2006/0091283 | A1 * | 5/2006 | Acker ................. B23K 26/0604 250/201.3 |
| 2006/0207976 | A1 | 9/2006 | Bovatsek et al. |
| 2007/0298529 | A1 | 12/2007 | Maeda et al. |
| 2009/0151996 | A1 | 6/2009 | Mishima et al. |
| 2009/0294422 | A1 | 12/2009 | Lubatschowski et al. |
| 2010/0084384 | A1 | 4/2010 | Bovatsek et al. |
| 2011/0259631 | A1 | 10/2011 | Rumsby |
| 2012/0061878 | A1 * | 3/2012 | Hofmann ........... B23K 26/0643 264/400 |
| 2012/0145331 | A1 * | 6/2012 | Gomez ............... C03B 33/0222 156/712 |
| 2012/0234807 | A1 | 9/2012 | Sercel et al. |
| 2013/0126573 | A1 | 5/2013 | Hosseini et al. |
| 2014/0079570 | A1 | 3/2014 | Schweitzer et al. |
| 2014/0199519 | A1 | 7/2014 | Schillinger et al. |
| 2014/0213040 | A1 | 7/2014 | Morikazu et al. |
| 2014/0248757 | A1 | 9/2014 | Morikazu et al. |
| 2014/0340730 | A1 | 11/2014 | Bergh et al. |
| 2015/0034613 | A1 | 2/2015 | Hosseini |
| 2015/0044416 | A1 | 2/2015 | Hosseini |
| 2015/0166393 | A1 | 6/2015 | Marjanovic et al. |
| 2015/0166394 | A1 | 6/2015 | Marjanovic et al. |
| 2015/0360991 | A1 | 12/2015 | Grundmueller et al. |
| 2015/0367442 | A1 | 12/2015 | Bovatsek et al. |
| 2016/0009586 | A1 | 1/2016 | Bookbinder et al. |
| 2016/0031745 | A1 | 2/2016 | Ortner et al. |
| 2016/0059359 | A1 | 3/2016 | Krueger et al. |
| 2016/0060156 | A1 | 3/2016 | Krueger et al. |

FOREIGN PATENT DOCUMENTS

| | | | |
|---|---|---|---|
| CN | 102785031 | | 4/2015 |
| EP | 2781296 | | 9/2014 |
| EP | 2754524 | | 11/2015 |
| JP | 2010160734 | | 7/2010 |
| JP | 4692717 | | 3/2011 |
| JP | 5089735 | | 9/2012 |
| JP | 5271092 | | 5/2013 |
| WO | 0125137 | A1 | 4/2001 |
| WO | 2009114375 | A2 | 9/2009 |
| WO | 2012006736 | | 1/2012 |
| WO | WO-2012006736 | A2 * | 1/2012 ......... B23K 26/0057 |
| WO | 2014075995 | | 5/2014 |
| WO | 2014079570 | | 5/2014 |
| WO | 2014111385 | | 7/2014 |
| WO | 2014111794 | | 7/2014 |
| WO | 2014121261 | | 8/2014 |
| WO | 2014161535 | | 10/2014 |
| WO | 2015075059 | | 5/2015 |
| WO | 2015094994 | | 6/2015 |
| WO | 2015095264 | | 6/2015 |
| WO | 2016007843 | | 1/2016 |
| WO | 2016010949 | | 1/2016 |
| WO | 2016079063 | | 5/2016 |
| WO | 2016079275 | | 5/2016 |

OTHER PUBLICATIONS

Watanabe et al., Filamentation in Ultrafast Laser Material Processing, Book for Springer Series "Progress in Ultrafast Intense Laser Science", pp. 1-6.

Yoshino et al., Micromachining With a High Repetition Rate Femtosecond Fiber Laser, JLMN—Journal of Laser Micro/Nanoengineering, 2008, pp. 157-162, vol. 3, No. 3.

Rezaei, Saeid, Burst-Train Generation for Femtosecond Laser Filamentation-Driven Micromachining, Thesis, Graduatute Department of Electrical and Computer Engineering, Jan. 2011, pp. 1-118, University of Toronto.

Nguyen et al., Optical Breakdown Versus Filamentation in Fused Silica by Use of Femtosecond Infrared Laser Pulses, Optics Letter, vol. 28, No. 17, Sep. 1, 2003, pp. 1591-1593, Department of Physics, Universite Laval, Quebec, Canada.

Nicholson, David, Laser Pulse Filamentation, Submitted Coursework for PH240, Stanford University, Nov. 27, 2011, pp. 1-4.

Zlotnicki, Steve, What Is Cutting Kerf, May 19, 2013, www.esab-cutting.com, pp. 1-4.

Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.

Hosseini, S. Abbas, Method and Apparatus for Performing Laser Filamentation Within Transparent Materials, U.S. Appl. No. 14/336,819, filed Jul, 21, 2014, Applicant: Rofin-Sinar Technologies Inc.

Hosseini, S. Abbas, System for Performing Laser Filamentation Within Transparent Materials, U.S. Appl. No. 14/336,912, filed Jul. 21, 2014, Applicant: Rofin-Sinar Technologies Inc.

Strigin et al., Laser Processing of Glass by Picosecond Pulses, Quantum Electronics, 1994, pp. 732-735, vol. 24, No. 8, Kvantovaya Elektronika and Turpion Ltd.

Bhuyan et al., High Aspect Ratio Taper-Free Microchannel Fabrication Using Femtosecond Bessel Beams, Optics Express, Jan. 18, 2010, pp. 566-574, vol. 18, No. 2.

* cited by examiner

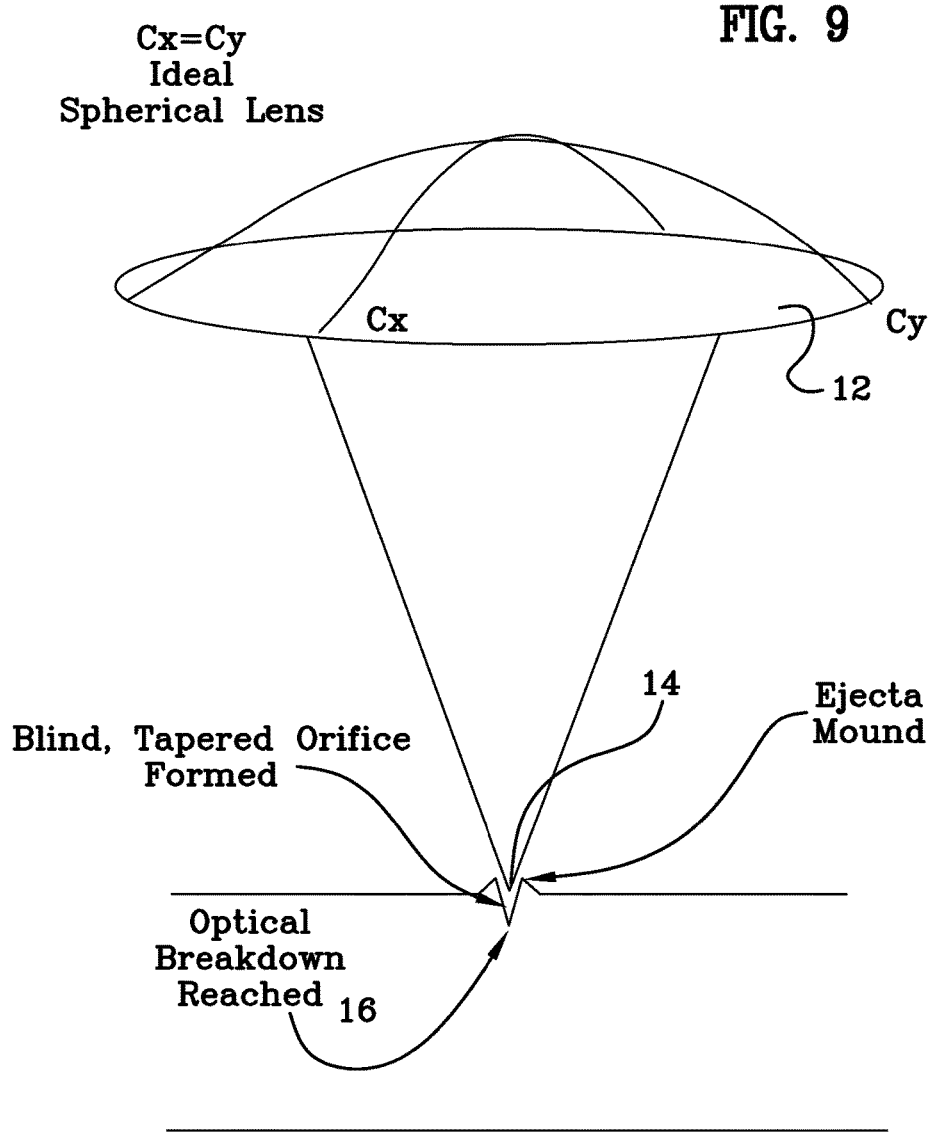

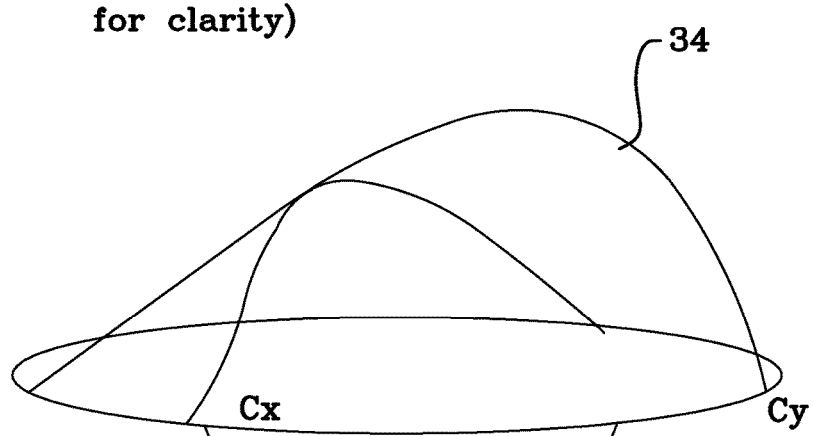
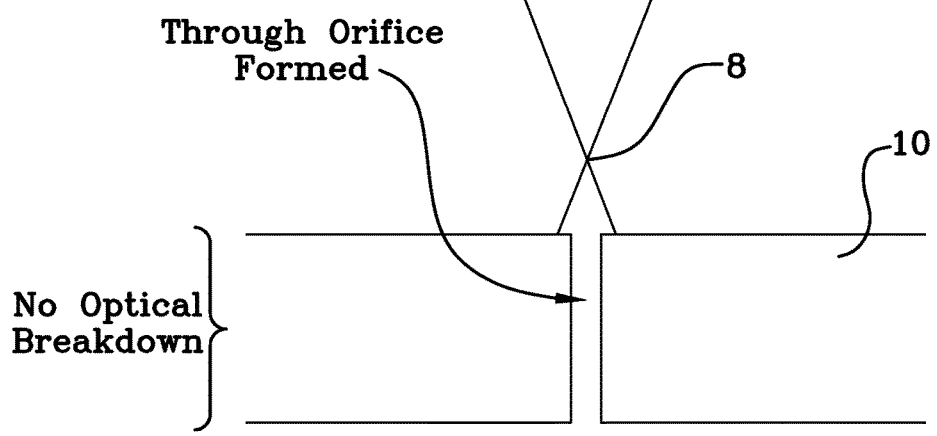
FIG. 10

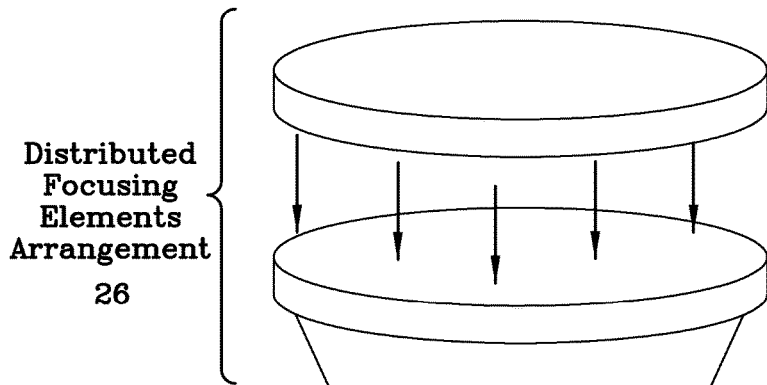
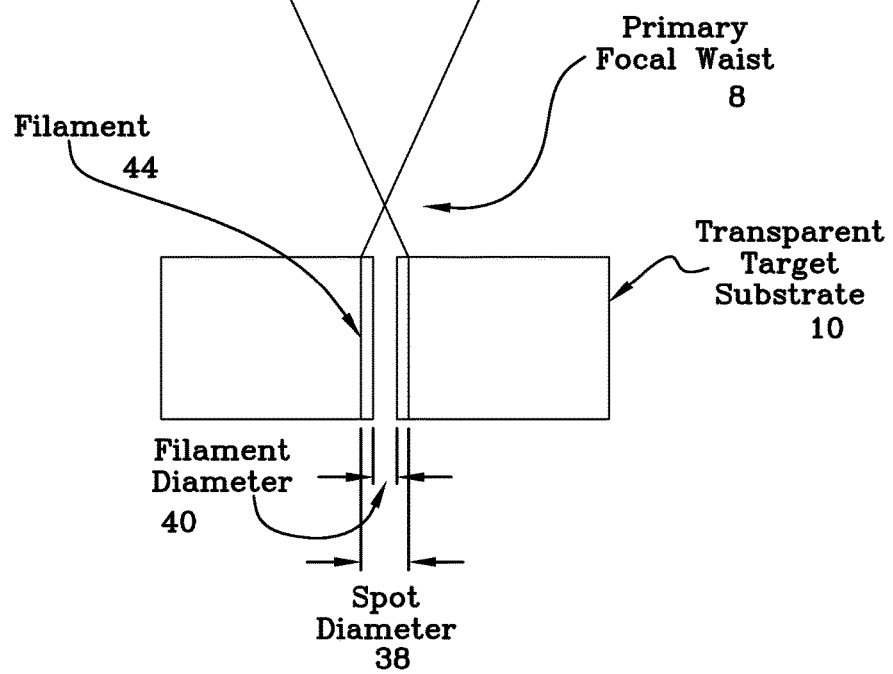
FIG. 11

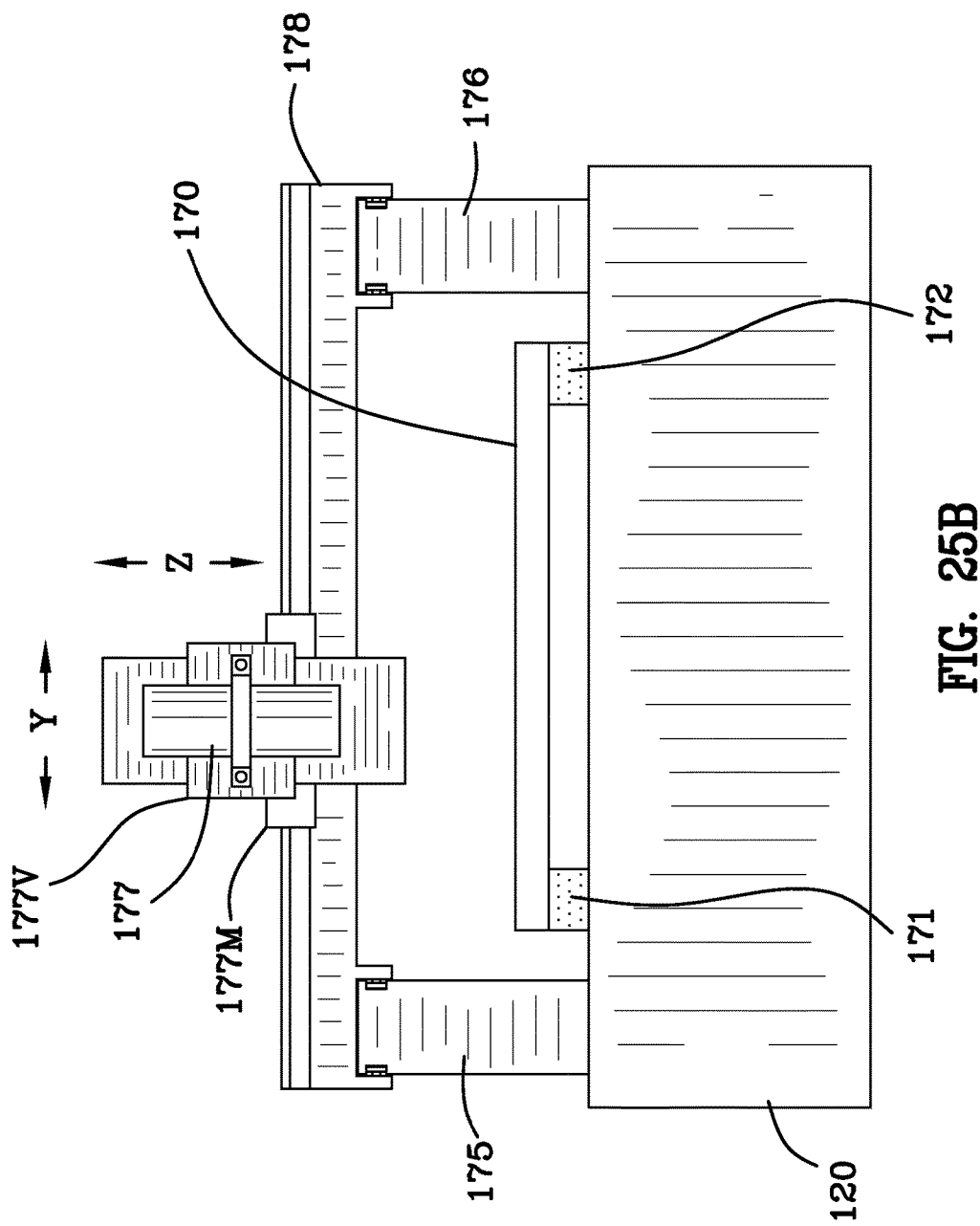

METHOD OF FABRICATING A GLASS MAGNETIC HARD DRIVE DISK PLATTER USING FILAMENTATION BY BURST ULTRAFAST LASER PULSES

This patent application claims priority to and the benefit of U.S. provisional patent application Ser. No. 61/895,921 filed Oct. 25, 2013. U.S. provisional patent application Ser. No. 61/895,921 filed Oct. 25, 2013 is incorporated herein in its entirety by reference hereto.

BACKGROUND OF THE INVENTION

The present invention relates to a non-ablative method and apparatus for making an economical hard disk (platter) for a computer hard disk drive (HDD) using a material machining technique involving filamentation by burst ultrafast laser pulses that is better suited to mass production. The current method of making the platters that store data inside hard disks has been refined so much that it does not allow for further significant improvements without the use of this novel machining technique.

Hard disk drives are data storage devices used for storing and retrieving digital information using rapidly rotating disks (platters) coated with magnetic material. A HDD consists of one or more rigid ("hard") rapidly rotating disks ("platters") with magnetic heads arranged on a moving actuator arm to read and write data to the surfaces. HDDs were introduced by IBM in the mid 1950's and are still the dominant secondary storage device for servers and personal computers.

A HDD records data by magnetizing a thin film of ferromagnetic material on a disk. Sequential changes in the direction of magnetization represent binary data bits. The data is read from the disk by detecting the transitions in magnetization. User data is encoded using an encoding scheme, such as run-length limited encoding which determines how the data is represented by the magnetic transitions.

A typical HDD design consists of a spindle that holds flat circular disks, also called platters, which hold the recorded data. In the HDD the hard-drive heads fly and move radially over the surface of the spinning platters to read or write the data. Extreme smoothness, durability, and perfection of finish are required properties of a hard-disk platter. The platters are typically made from a non-magnetic material, usually aluminum alloy, glass, or ceramic that is then coated with a thin magnetic material and a protective overcoat. While the coatings that are applied to the disk give it the data storage properties, the blank has to be perfect in every shape, form and plane before any of these coating processes can occur.

Platters made from a glass substrate have outstanding data storage capacity and higher access speeds than plastic substrates but are more costly to manufacture. Glass is the substrate of preference for HDDs because they achieve a more balanced platter (more even thickness), can withstand more rotational stress, have higher shock resistance and increased reliability, are much smoother than the other substrate materials (important for low fly height) and don't deform as readily under centrifugal loads (better for low fly heights and high TPI). Glass has a coefficient of thermal expansion close to the stainless steel of the motor hub, reducing deformation as the HDD heats up. Glass is stronger than Aluminum for the same thickness so glass platters can be thinner (important for a laptop's low-profile HDD or for high capacity HDDs with multiple platters). Glass is also better for non-operating shock for HDDs that "land" heads on the media, because glass is harder for the heads to dent. Simply stated, glass is the preferred substrate media for HHDs but is quite a bit more expensive than the other HDD substrate medias.

The cost for the glass itself accounts for some of the higher price but the majority of this difference is because of the cost of the additional steps to get the glass blank platter prepared for coating. Utilizing a glass substrate in conjunction with recent discoveries in transparent material machining will result in a simplified fabrication process that will eliminate fabrication steps and fabrication costs, therein rendering glass platters the financially advantageous choice. Henceforth, a faster, economical system for eliminating steps in the fabrication of HDD platters by using a material machining technique involving filamentation by burst ultrafast laser pulses would fulfill a long felt need in the industry. This new invention utilizes and combines known and new technologies in a unique and novel configuration to overcome the aforementioned problems and accomplish this.

SUMMARY

The general purpose of the present invention, which will be described subsequently in greater detail, is to provide an apparatus and method for decreased cost fabrication of the glass platters for a HDD.

For a HDD to work, the platter surfaces must be absolutely perfect to tolerances measured in Angstroms (0.0000001 millimeter). Hard drive platters typically spin between 5,000 and 10,000 RPM with some high performance hard drives spinning platters even faster. The spinning platter creates a tiny air current on the surface. The read/write heads are designed to make use of this air current and fly about 2 nanometers above the surface of the platter. (A human hair measures roughly 8,500 times the gap between the head and the platter.) Any platter imperfection will cause the head to crash and destroy the magnetic recording surface.

To manufacture something so large and so thin and end up with something so flat, so parallel, so smooth and so true about its axis, requires extreme precision and cleanliness. Glass is the preferential choice of media for the platter substrate. However, the prior art method of creating a platter blank from glass, requires the glass be formed into a sheet from which the glass substrate blanks will be cut with a diamond saw (or roller) or scribed and flexed to separate. This is the rough shaping or machining of the platter. This is followed by the finish machining of having the blank's edges seemed, edge ground and washed. These are expensive, time consuming steps and each step introduces a higher probability of particle contamination on the platter by released abrasive particles in all the processes of rough machining and finishing machining.

Alternately, each blank may be individually poured (rare) into a blank mold, although this blank will also have to have its edges ground, polished and washed. Thereafter the blanks are individually surface ground to a high level of precision to achieve the necessary surface smoothness to allow the subsequent steps of surface coating applications and polishing (adhesive layers, underlayers, magnetic data recording layers, protective overcoat layers and lubricant layers). These steps are carried out on both sides of the platter so that it ends up with two recording surfaces.

The present invention uses two novel, related methods of forming the HDD's platter blank in two distinct fabrication methods that eliminate many of the steps. These two methods are only achievable because of the precise shaped, smooth peripheral edge left on the platter after filamentation by burst ultrafast laser pulses machining by the disclosed method. In the first method the platter blanks are precisely cut using filamentation by burst ultrafast laser pulses such that the blank's edges need not be ground and the platter's geometric circularity need not be corrected prior to coating. In the second method, the glass substrate's surfaces are completely processed through all stages of polishing and magnetic media coatings in sheet form, and then the platters are cut out of the processed sheet not as blanks, but rather as finished platters, needing no further (or minimal) fabrication. As a result, these two methods reduce the product contamination, speed up production, and realize great reductions in the quantity of waste materials and lower production costs. In this type of laser cutting, the spacing between adjacent blanks is minimized. Essentially, the present invention eliminates the platter's rough machining step, currently utilized in the current technology. The current laser machining technology cannot be used to gain any fabrication or cost advantage in this process because it utilizes ablative cutting which does not leave the platter blank's peripheral edge finished to a level suitable for coating without edge grinding; leaves a raised ejecta mound about the edge that requires surface grinding; results in a high level of surface contamination from ejecta; and leaves the structure of the platter in the area of the cutting compromised. Basically, the current technology in laser machining cannot be used in the fabrication of HDD platters to eliminate processing steps or lower production costs.

The following specification describes novel and unique methods to create HDD platters from transparent material such as glass, although Si wafers, Sapphire or the like could also be utilized. The method disclosed has many of the advantages mentioned heretofore and many novel features that result in a new method of manufacturing HDD platters which is not anticipated, rendered obvious, suggested, or even implied by any of the prior art, either alone or in any combination thereof.

It is an object of the present invention to provide a method of producing glass hard disk drive platters using laser machining, comprising the steps of:

providing a planar glass substrate;
providing a laser beam comprising a burst of laser pulses;
providing a laser beam delivery system capable of focusing said laser beam onto said planar glass substrate and to enable relative movement between said laser beam and said planar glass substrate;
focusing said laser beam relative to said planar glass substrate to form a beam waist at a location external to said planar glass substrate, said laser pulses focused such that a sufficient energy density is maintained within said planar glass substrate to form a continuous laser filament therethrough without causing optical breakdown;
creating a laser filament that pierces completely through said planar glass substrate by photoacoustic compression; and,
moving said laser filament in circular geometric patterns in and relative to said planar glass substrate with said laser beam delivery system cutting circular hard disk drive platters from said planar glass substrate by photoacoustic compression.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are set forth in greater detail below.

BRIEF DESCRIPTION OF THE DRAWINGS

FIG. 9 is a diagrammatic representation of the prior art ablative laser drilling arrangement;

FIG. 10 is a diagrammatic representation of the present invention;

FIG. 11 is a diagrammatic view of the present invention utilizing a distributed focus lens arrangement;

FIG. 25 B is a schematic side view of the example laser system for cutting glass hard disk drive platters illustrated in FIG. 25A;

DETAILED DESCRIPTION

Figure 1:
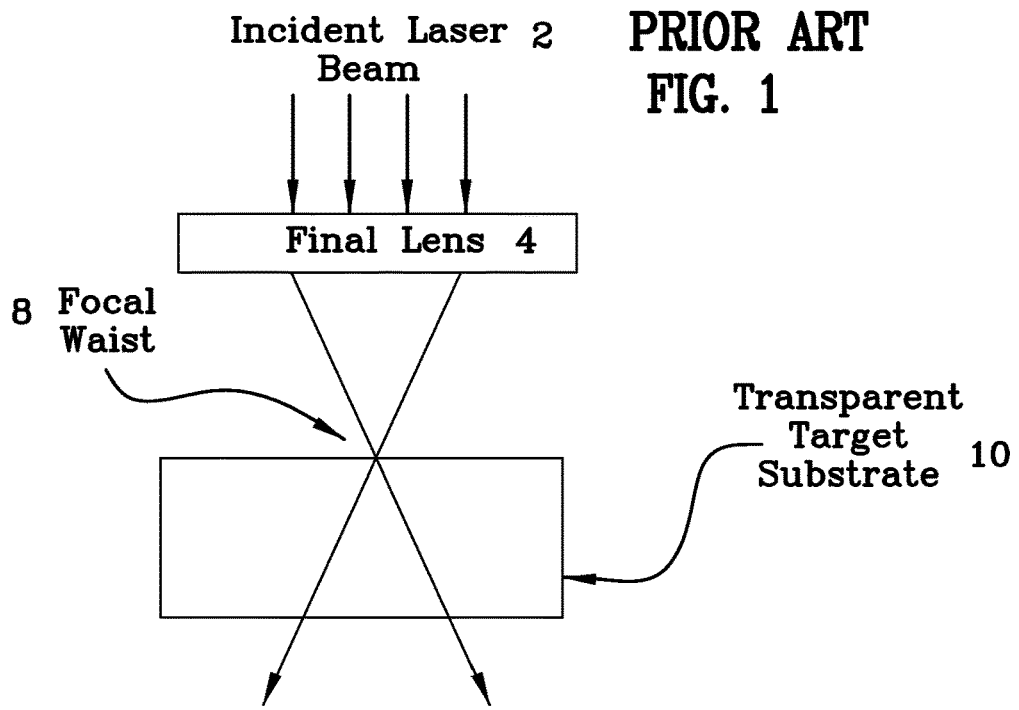
FIG. 1 is a diagrammatic representation of a prior art ablative laser drilling arrangement wherein the principal focus occurs at the top surface of the transparent substrate.

Currently, the prior art HDD platter fabricating systems produce glass platter blanks in a rough machined state through the use of a diamond saw. In the diamond cutting process, after diamond cutting is performed, a mechanical roller applies stress to propagate cracks that cleave the sample. This process creates poor quality edges, microcracks, wide kerf width, and substantial debris that are major disadvantages in the lifetime, efficiency, quality, and reliability of the product, while also incurring additional cleaning and polishing steps. The cost of de-ionized water to run the diamond scribers are more than the cost of ownership of the scriber and the technique is not environmentally friendly since water gets contaminated and needs refining, which further adds to the production cost. This first, rough machining step requires subsequent grinding and polishing of both the platter's peripheral edges and planar surfaces before the platter can proceed to the finish machining stages prior to coatings can be applied. Current technology laser exposure techniques such as ablative machining or high speed laser scribing have not proven to be useful for cutting glass platter blanks because the platters formed by their techniques are still in the rough machining stage. Each of these techniques leave rough peripheral edges on the blanks as well as rough or ejecta mound laden adjacent areas. This is followed by the finish machining of having the blank's edges edge ground, polished and washed. These are expensive, time consuming steps and each step introduces a higher probability of particle contamination on the platter by released abrasive particles in all the processes of rough machining. All of the prior art systems have disadvantages such as low throughput times, propagation of cracks in the glass, leave an unacceptable surface roughness (or ejecta) on the platters peripheral edge and surrounding surface; leave large regions of collateral thermal damage (i.e. heat affected zones) that can lead to premature failure of the HDD platter.

The present invention discloses two related methods of making a HDD glass platter using filamentation by a burst of ultrafast laser pulses with specific adjustments of the laser parameters in conjunction with a distributed focus lens assembly that creates a plurality of different foci wherein the principal focal waist never resides in or on the surface of the target so as to create a filament in the material that develops a cut line in any or each member of a stacked array of the platter substrates. While the present disclosure focuses primarily on the cutting (machining) of circular disks from a glass substrate, it is understood that the system and method described herein are equally applicable to the smooth edge machining processes of cutting and scribing other transparent targets such as sapphire. The apparatus and methodology employed to cut the HDD platters will be detailed herein as the laser machining technology, the laser machining system, and the HDD platter cutting methodology.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The Laser Machining Technology

Stopped or through orifices may be drilled beginning at any depth, or in any one of a set of stacked wafers, plates or substrates, primarily, but not limited to, transparent materials such that the structural characteristics of the orifice and surrounding material exceed that found in the prior art. Movement of the laser beam in relation to the target substrate offers machining in the form of substrate (target) slicing or cutting. This can be accomplished in any or each member of a stacked array of materials by a novel method using interference of burst of ultrafast laser pulses wherein the laser light and focusing parameters have been adjusted to create a filament inside the material that can create an orifice or cut through a specified depth of the transparent substrate.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the term ablative drilling/cutting refers to a method of machining a target (generally by cutting or drilling of a substrate by the removal of material) surface by irradiating it with a laser beam. At low laser flux, the material is heated by the absorbed laser energy and evaporates or sublimates. At high laser flux, the material is typically converted to a plasma. Usually, laser ablation refers to removing material with a pulsed laser, but it is possible to ablate material with a continuous wave laser beam if the laser intensity is high enough. Ablative drilling or cutting techniques are characterized by the creation of a debris field, the presence of a liquid/molten phase at some point during the material removal process, and the creation of an ejecta mound at the entrance and/or exit of the feature.

As used herein, the term "photoacoustic cutting" refers to a method of machining a target (generally by cutting or drilling of a substrate from a solid by irradiating it with a lower pulse energy light beam than is used in ablative drilling or cutting techniques. Through the processes of optical absorption followed by thermoelastic expansion, broadband acoustic waves are generated within the irradiated material to form a pathway of compressed material about the beam propagation axis (common with the axis of the orifice) therein that is characterized by a smooth wall orifice, a minimized or eliminated ejecta and minimized microcrack formation in the material. This phenomena is also known as "photoacoustic compression".

As used herein the term "optical efficiency" relates to the ratio of the fluence at the principal focal waist to the total incident fluence at the clear aperture of the focusing element or assembly.

As used herein, the term "transparent" means a material that is at least partially transparent to an incident optical beam. More preferably, a transparent substrate is characterized by absorption depth that is sufficiently large to support the generation of an internal filament modified array by an incident beam according to embodiments described herein. Put another way, a transparent material has an absorption spectrum and thickness such that at least a portion of the incident beam is transmitted in the linear absorption regime.

As used herein, the term "filament modified zone" refers to a filament region within a substrate characterized by a region of compression defined by the optical beam path.

As used herein, the phrases "burst", "burst mode", or "burst pulses" refer to a collection of laser pulses having a relative temporal spacing that is substantially smaller than the repetition period of the laser. It is to be understood that the temporal spacing between pulses within a burst may be constant or variable and that the amplitude of pulses within a burst may be variable, for example, for the purpose of creating optimized or pre-determined filament modified zones within the target material. In some embodiments, a burst of pulses may be formed with variations in the intensities or energies of the pulses making up the burst.

As used herein, the phrase "geometric focus" refers to the normal optical path along which light travels based on the curvature of the lens, with a beam waist located according to the simple lens equation common to optics. It is used to distinguish between the optical focus created by the position of the lenses and their relation to one another and the constriction events created by thermal distortion in the target materials providing, in effect, a quasi-Rayleigh length on the order of up to 15 mm, which is particularly uncommon and related to the inventive nature of this work.

As used herein, the term "substrate" means a glass or a semiconductor and may be selected from the group consisting of transparent ceramics, polymers, transparent conductors, wide bandgap glasses, crystals, crystalline quartz, diamond, sapphire, rare earth formulations, metal oxides for displays and amorphous oxides in polished or unpolished condition with or without coatings, and meant to cover any of the geometric configurations thereof such as but not limited to plates and wafers. The substrate may comprise two or more layers wherein a location of a beam focus of the focused laser beam is selected to generate filament arrays within at least one of the two or more layers. The multilayer substrate may comprise multi-layer flat panel display glass, such as a liquid crystal display (LCD), HDD glass platter substrate, flat panel display (FPD), and organic light emitting display (OLED). The substrate may also be selected from the group consisting of autoglass, tubing, windows, biochips, optical sensors, planar lightwave circuits, optical fibers, drinking glass ware, art glass, silicon, 111-V semiconductors, microelectronic chips, memory chips, sensor chips, electro-optical lenses, flat displays, handheld computing devices requiring strong cover materials, light emitting diodes (LED), laser diodes (LD), and vertical cavity surface emitting laser (VCSEL). Targets or target materials are generally selected from substrates.

As used herein the "principal focal waist" refers to the most tightly focused and strongest focal intensity of the beam after final focusing (after passing through the final optical element assembly prior to light incidence upon the target). It may also be used interchangeably with the term "principal focus." The term "secondary focal waist" refers to any of the other foci in the distributed beam having a lesser intensity than the principal focal waist. It may also be used interchangeably with the term "secondary focus' or "secondary foci."

As used herein the term "filament" refers to any light beam traveling through a medium wherein the Kerr effect can be observed or measured.

As used herein, "laser filamentation" is the act of creating filaments in a material through the use of a laser.

As used herein the term "sacrificial layer" refers to a material that can be removably applied to the target material.

As used herein the term "machining" or "modification" encompasses the processes of drilling orifices, cutting, scribing or dicing a surface or volume of a target or substrate.

As used herein the term "focal distribution" refers to spatiotemporal distribution of incident light rays passing through a lens assembly that in its aggregate is a positive lens. Generally, herein their subsequent convergence of spots of useful intensity as a function from the distance from the center of the focusing lens is discussed.

As used herein the terms "critical energy level," "threshold energy level" and 'minimum energy level" all refer to the least amount of energy that must be put into or onto a target to initiate the occurrence of a transient process in the target material such as but not limited to ablative machining, photoacoustic machining, and the Kerr effect.

As used herein the term "aberrative lens" refers to a focusing lens that is not a perfect lens wherein the lens curvature in the x plane does not equal the lens curvature in the y plane so as to create a distributed focal pattern with incident light that passes through the lens. A positive abberrative lens is a focally converging lens and a negative abberrative lens is a focally diverging lens.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

The following methodology will provide fast, reliable and economical non-ablative laser machining technique to initiate orifices (stopped/blind or through orifices) in the target material that may be initiated below or above a single or multiple stacked target material by filamentation by a burst(s) of ultrafast laser pulses. The movement of the laser beam with respect to the target material will direct the filament to cut or slice the target. Ultra short pulse lasers offer high intensity to micromachine, to modify and to process surfaces cleanly by aggressively driving multiphoton, tunnel ionization, and electron-avalanche processes. The issue at hand is how to put enough energy in the transparent material of the target, less than that used in ablative drilling, but beyond the critical energy level to initiate and maintain photoacoustic compression so as to create a filament that modifies the index of refraction at the focal points in the material and does not encounter optical breakdown (as encountered by the prior art ablative drilling systems) such that continued refocusing of the laser beam in the target material can continue over long distances, enough so that even multiple stacked substrates can be drilled simultaneously with negligible taper over the drilled distance, a relatively smooth orifice wall and can initiate from above, below or within the target material. The filament formed by the fabrication unit's direction/steering can be used to drill orifices, cut, and scribe or dice a surface or volume of a target.

Figure 3:
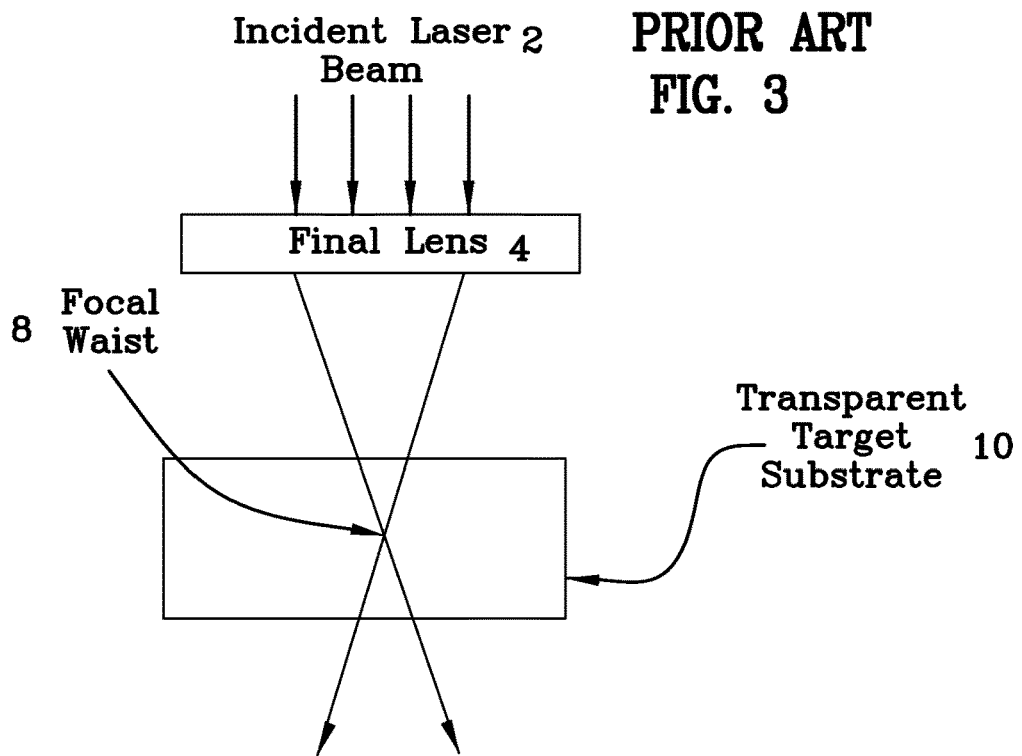
FIG. 3 is a representative side view of a prior art ablative laser drilling arrangement wherein the principal focus occurs below the top surface of the transparent substrate.
Figure 2:
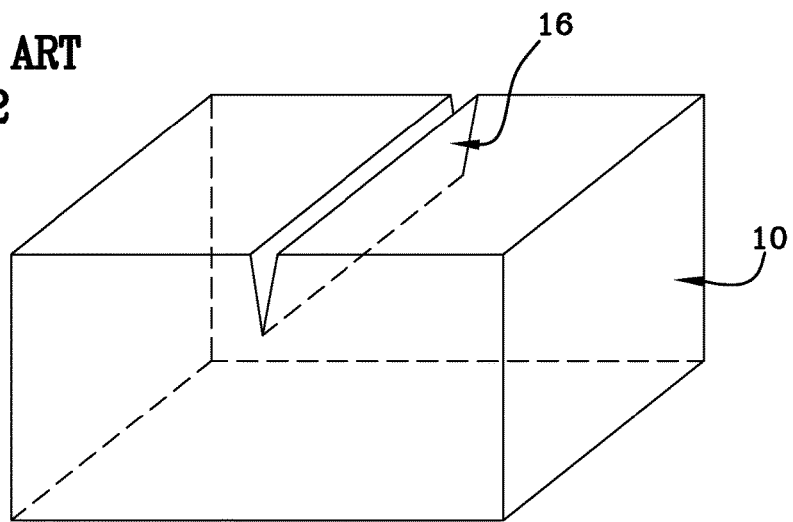
FIG. 2 is a perspective view of a an orifice formed by the drilling arrangement of FIG. 1.
Figure 4:
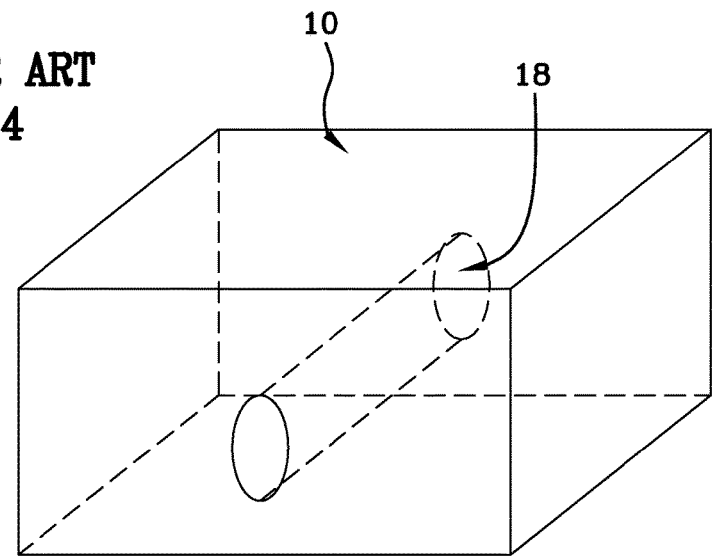
FIG. 4 is a perspective view of a an orifice formed by the drilling arrangement of FIG. 3.

Generally, in the prior art, laser ablation techniques that utilize a high energy pulsed laser beam that is focused to a single principal focus above, within or at a surface of the material, have been used to machine transparent materials. As shown in FIG. 1 the incident laser light beam 2 passes through a focusing assembly passing through a final focusing lens 4 so as to focus a non-distributed light beam 6 that has a focal waist 8 at the surface of the target 10. As can be seen in FIG. 3, optionally, the non-distributed light beam may be focused such that the focal waist resides within the target. Generally these techniques use a perfect spherical focusing lens 12, that is to say a lens that is non-aberrated that has curvature in the X plane that equals the curvature in the Y plane (Cx=Cy) or alternatively with a focusing element assembly that produces a non distributed beam having a single focus 14 as shown in FIG. 9. This creates a tight beam spot that is then delivered on as shown in FIG. 1 or in the target substrate material 10 as shown in FIG. 3. FIG. 2 illustrates the geometry of a machined slot 16 cut with the technique of FIG. 1, and FIG. 4 illustrates the geometry of an oblong orifice 18 made with the technique of FIG. 3.

Propagation of intense ultrafast laser pulses in different optical media has been well studied. Nonlinear refractive index of a material is a function of laser intensity. Having an intense laser pulse with Gaussian profile, wherein the central part of the pulse has much higher intensity than the tails, means the refractive index varies for the central and surrounding areas of the material seeing the laser beam pulse. As a result, during propagation of such laser pulse, the pulse collapses automatically. This nonlinear phenomenon is known in the industry as self-focusing. Self-focusing can be promoted also using a lens in the beam path. In the focal region the laser beam intensity reaches a value that is sufficient to cause multiple-ionization, tunnel ionization and avalanche ionization, which creates plasma in the material. Plasma causes the laser beam to defocus and refocus back to form the next plasma volume. The inherent problem with a single focus in a non-distributed beam is that the process ends after the laser pulses lose all their energy and are unable to refocus as discussed below.

This ablative method develops a filament in the material 10 of a length of up to 30 microns until it exceeds the optical breakdown threshold for that material and optical breakdown (OB) 16 occurs. See FIG. 9. At OB the maximum threshold fluence (the energy delivered per unit area, in units of $J/m^2$) is reached and the orifice diameter narrows and ablative machining or drilling ceases to proceed any deeper. This is the obvious drawback to using the prior art methods as they limit the size of the orifice that can be drilled, cause a rough orifice wall and result in an orifice with a taper 22 having a different diameter at the top and bottom surfaces of the target 10. See FIG. 5. This occurs because in ablative machining, the beam has central focus 8 (also referred to as a principal focal waist) at the surface of the target 10 causing localized heating and thermal expansion therein heating the surface of the material 10 to its boiling point and generating a keyhole. The keyhole leads to a sudden increase in optical absorptivity quickly deepening the orifice. As the orifice deepens and the material boils, vapor generated erodes the molten walls blowing ejecta 20 out and further enlarging the orifice 22. As this occurs, the ablated material applies a pulse of high pressure to the surface underneath it as it expands. The effect is similar to hitting the surface with a hammer and brittle materials are easily cracked. Additionally, brittle materials are particularly sensitive to thermal fracture which is a feature exploited in thermal stress cracking but not desired in orifice drilling. OB generally is reached when the debris is not ejected, a bubble is created in the orifice 22 or there is a violent ablation that cracks the target in the area of the orifice 22. Any one or combination of these effects causes the beam to scatter from this point or be fully absorbed not leaving enough beam power (fluence) to drill down through the material 10 any further. Additionally, this creates a distortion or roughness known as the ablative ejecta mound 20 found around the initiating point at the surface of the target substrate 10. See FIG. 5.

Figure 5:
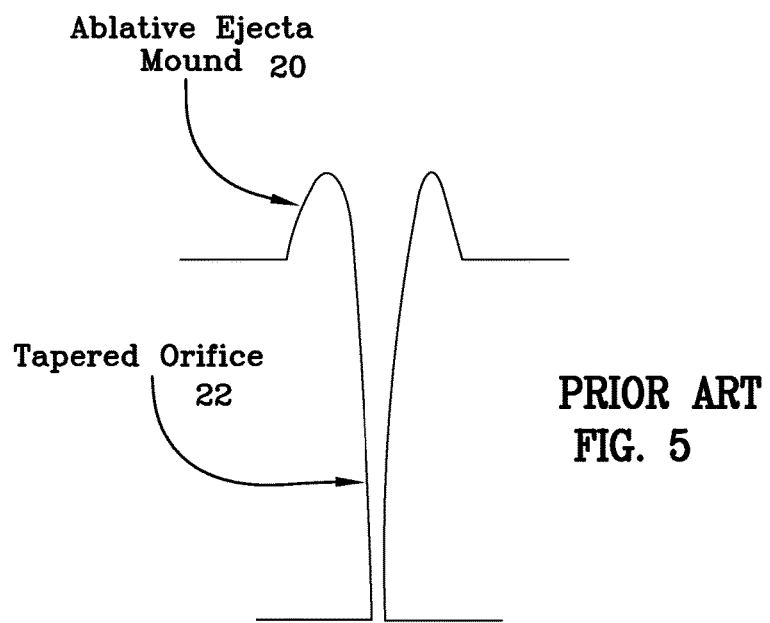
FIG. 5 is a representative side view of an orifice ablatively drilled as the laser arrangement of FIG. 1 wherein the primary focus occurs at the top surface of the transparent substrate.

Another problem with laser ablation techniques is that the orifices it drills are not of a uniform diameter as the laser beam filamentation changes its diameter as a function of distance. This is described as the Rayleigh range and is the distance along the propagation direction of a beam from the focal waist to the place where the area of the cross section is doubled. This results in a tapered orifice 22 as shown in FIGS. 2 and 5.

The present invention solves the optical breakdown problem, minimizes the orifice roughness and the ablative ejecta mound, and eliminates the tapering diameter orifice.

Figure 6:
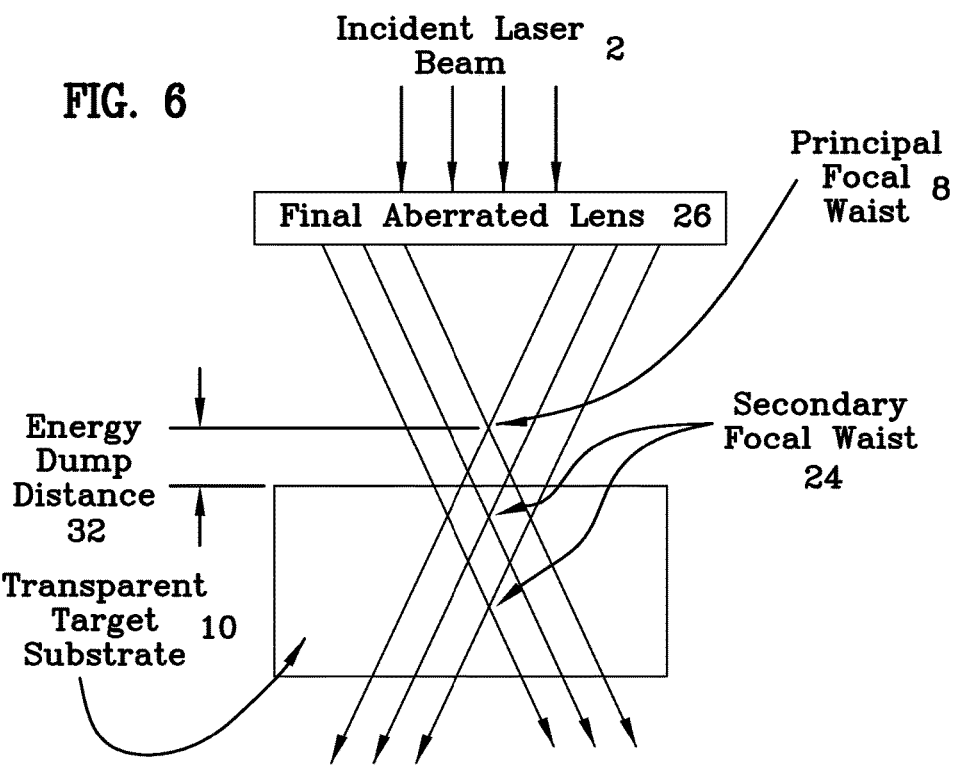
FIG. 6 is a diagrammatic representation of the laser drilling arrangement of the present invention wherein the primary focus occurs above the top surface of the transparent substrate.

The present disclosure provides devices, systems and methods for the processing of orifices in transparent materials by laser induced photoacoustic compression. Unlike previously known methods of laser material machining, embodiments of the present invention utilize an optical configuration that focuses the incident beam 2 in a distributed manner along the longitudinal beam axis such that there is a linear alignment of the principal focus 8 and secondary foci 24 (coincident to the linear axis of the orifice but vertically displaced from the principal focus or focal waist) to allow the continual refocusing of the incident beam 2 as it travels through the material 10 thereby enabling the creation of a filament that modifies the index of refraction along the beam path in the material 10 and does not encounter optical breakdown (as seen in the prior art ablative drilling systems both with and without the use of rudimentary filamentation) such that continued refocusing of the laser beam in the target material can continue over long distances. See FIG. 6.

Figure 7:
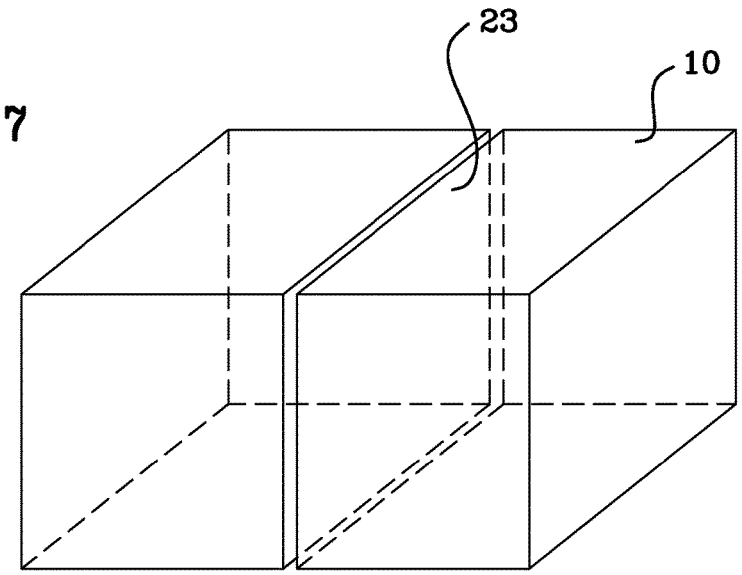
FIG. 7 is a perspective view of an orifice scribe in a transparent substrate formed by the laser drilling arrangement of the present invention.

This distributed focusing method allows for the "dumping" or reduction of unnecessary energy from the incident beam 2 found at the principal focal waist 8 by the creation of secondary foci 24 by the distributed focusing elements assembly 26, and by positioning the location of the principal focal waist 8 from on or in the material, to outside the material 10. This dumping of beam fluence combined with the linear alignment of the principal focal waist 8 and secondary focal waists 24, enables the formation of filaments over distances well beyond those achieved to date using previously known methods (and well beyond 1 mm) while maintaining a sufficient laser intensity (fluence μJ/cm²) to accomplish actual modification and compression over the entire length of the filament zone. This distributed focusing method supports the formation of filaments with lengths well beyond one millimeter and yet maintaining an energy density beneath the optical breakdown threshold of the material with enough intensity enough so that even multiple stacked substrates can be drilled simultaneously across dissimilar materials (such as air or polymer gaps between layers of target material) with negligible taper over the drilled distance, (FIG. 7) and a relatively smooth walled orifice wall that can be initiated from above, below or within the target material. Propagating a non-tapered wall slit 23 in a target 10 is accomplished by the relative movement of the target 10 while machining an orifice.

The optical density of the laser pulse initiates a self focusing phenomena and generates a filament of sufficient intensity to non-ablative initial photoacoustic compression in a zone within/about/around the filament so as to create a linear symmetrical void of substantially constant diameter coincident with the filament, and also causes successive self focusing and defocusing of said laser pulse that coupled with the energy input by the secondary focal waists of the distributed beam forms a filament that directs/guides the formation of the orifice across or through the specified regions of the target material. The resultant orifice can be formed without removal of material from the target, but rather by a photoacoustic compression of the target material about the periphery of the orifice formed.

Figure 8:
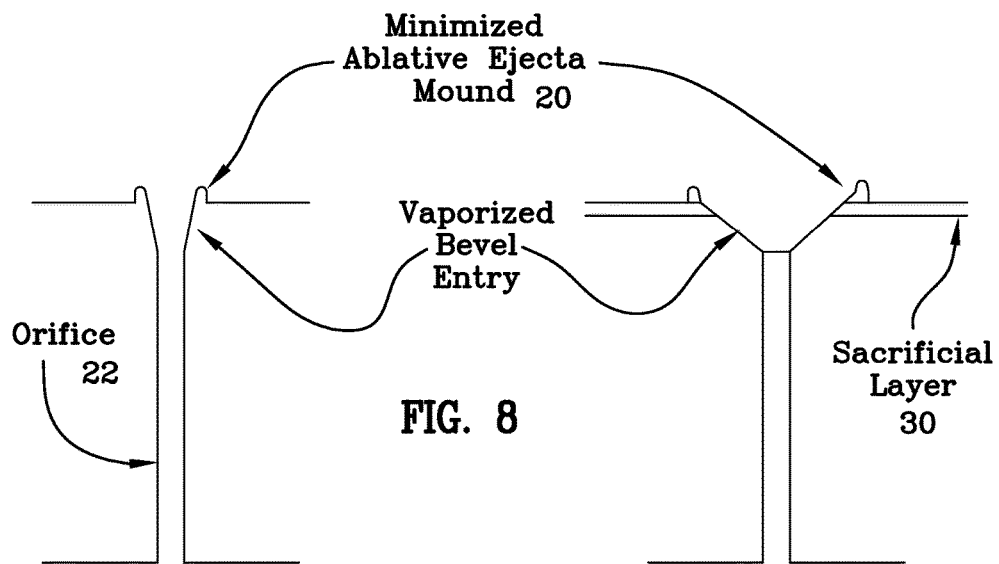
FIG. 8 is a representative side view of two orifices drilled by the laser arrangement of FIG. 6.

It is known that the fluence levels at the surface of the target 10 are a function of the incident beam intensity and the specific distributed focusing elements assembly, and are adjusted for the specific target material(s), target(s) thickness, desired speed of machining, total orifice depth and orifice diameter. Additionally, the depth of drilled orifice is dependent on the depth over which the laser energy is absorbed, and thus the amount of material removed by a single laser pulse, depends on the material's optical properties and the laser wavelength and pulse length. For this reason a wide range of process parameters are listed herein with each particular substrate and matching application requiring empirical determination for the optimal results with the system and materials used. As such, the entry point on the target 10 may undergo some minimal ablative ejecta mound formation 20 if the fluence levels at the surface are high enough to initiate momentary, localized ablative (vaporized) machining, although this plasma creation is not necessary. In certain circumstances it may be desirable to utilize a fluence level at the target surface that is intense enough to create the transient, momentary ablative drilling to give a broad bevelled entry yet have the remainder of the orifice 22 of uniform diameter as would be created by a distributed focus hybrid drilling method using an energy level that permits a momentary ablative technique followed by a continual photo acoustic compression technique. See FIG. 8. This can be accomplished by the present invention by selection of a fluence level at the target surface that balances the linear absorption against the non linear absorption of the beam in the material such that the fluence level required for ablative machining will be exhausted at the desired depth of the bevelled (or other geometric configuration). This hybrid technique will result in a minor ejecta mound 20 that can be eliminated if a sacrificial layer 30 is applied to the target surface. Common sacrificial layers are resins or polymers such as but not limited to PVA, Methacrylate or PEG, and generally need only be in the range of 1 to 300 microns thick (although the 10-30 micron range would be utilized for transparent material machining) and are commonly applied by spraying the sacrificial layer onto the target material. The sacrificial layer will inhibit the formation of an ejecta mound on the target 10 by preventing molten debris from attaching itself to the surface, attaching instead to the removable sacrificial material as is well known in the art.

To accomplish photoacoustic compression machining requires the following system:

A burst pulse laser system capable of generating a beam comprising a programmable train of pulses containing from 2 to 50 subpulses within the burst pulse envelope. Further the laser system needs to be able to generate average power from 1 to 200 watts depending on the target material utilized, typically this range would be in the range of 50 to 100 watts for borosilicate glass.

A distributed focusing element assembly (potentially comprising positive and negative lenses but having a positive focusing effect in the aggregate) capable of producing a weakly convergent, multi foci spatial beam profile where the incident fluence at the target material is sufficient to cause Kerr-effect self-focusing and propagation.

An optical delivery system capable of delivering the beam to the target.

Commercial operation would also require translational capability of the material (or beam) relative to the optics (or vice versa) or coordinated/compound motion driven by a system control computer.

The use of this system to drill photoacoustic compression orifices requires the following conditions be manipulated for the specific target(s): the properties of the distributed focus element assembly; the burst pulsed laser beam characteristics; and the location of the principal focus.

The distributed focus element assembly 26 may be of a plethora of generally known focusing elements commonly employed in the art such as aspheric plates, telecentric lenses, non-telecentric lenses, aspheric lenses, annularly faceted lenses, custom ground aberrated (non-perfect) lenses, a combination of positive and negative lenses or a series of corrective plates (phase shift masking), any optical element tilted with respect to the incident beam, and actively compensated optical elements capable of manipulating beam propagation. The principal focal waist of a candidate optical element assembly as discussed above, generally will not contain more than 90% nor less than 50% of incident beam fluence at the principal focal waist. Although in specific instances the optical efficiency of the distributed focus element assembly 26 may approach 99%.

FIG. 10 illustrates a non-aspherical, aberrated lens 34 as would be used in the aforementioned process. The actual optical efficiency of the distributed focus element assembly 26 will have to be fine-tuned for each specific application. The users will create a set of empirical tables tailored for each transparent material, the physical configuration and characteristics of the target as well as the specific laser parameters. Silicon Carbide, Gallium Phosphide, sapphire, strengthened glass etc., each has their own values. This table is experimentally determined by creating a filament within the material (adjusting the parameters of laser power, repetition rate, focus position and lens characteristics as described above) and ensuring that there is sufficient fluence to induce a plane of cleavage or axis of photoacoustic compression to create an orifice. A sample optical efficiency for drilling a 5 micron diameter through orifice (as illustrated in FIG. 11) in a 2 mm thick single, planar target made of borosilicate with a 1 micron, 50 watt laser outputting a burst pulse of 10 μJ energy having a frequency (rep rate) that would lie in the 1 MHz range is 65% wherein the principal focal waist of the beam resides 1 mm off of the desired point of initiation.

Figure 12:
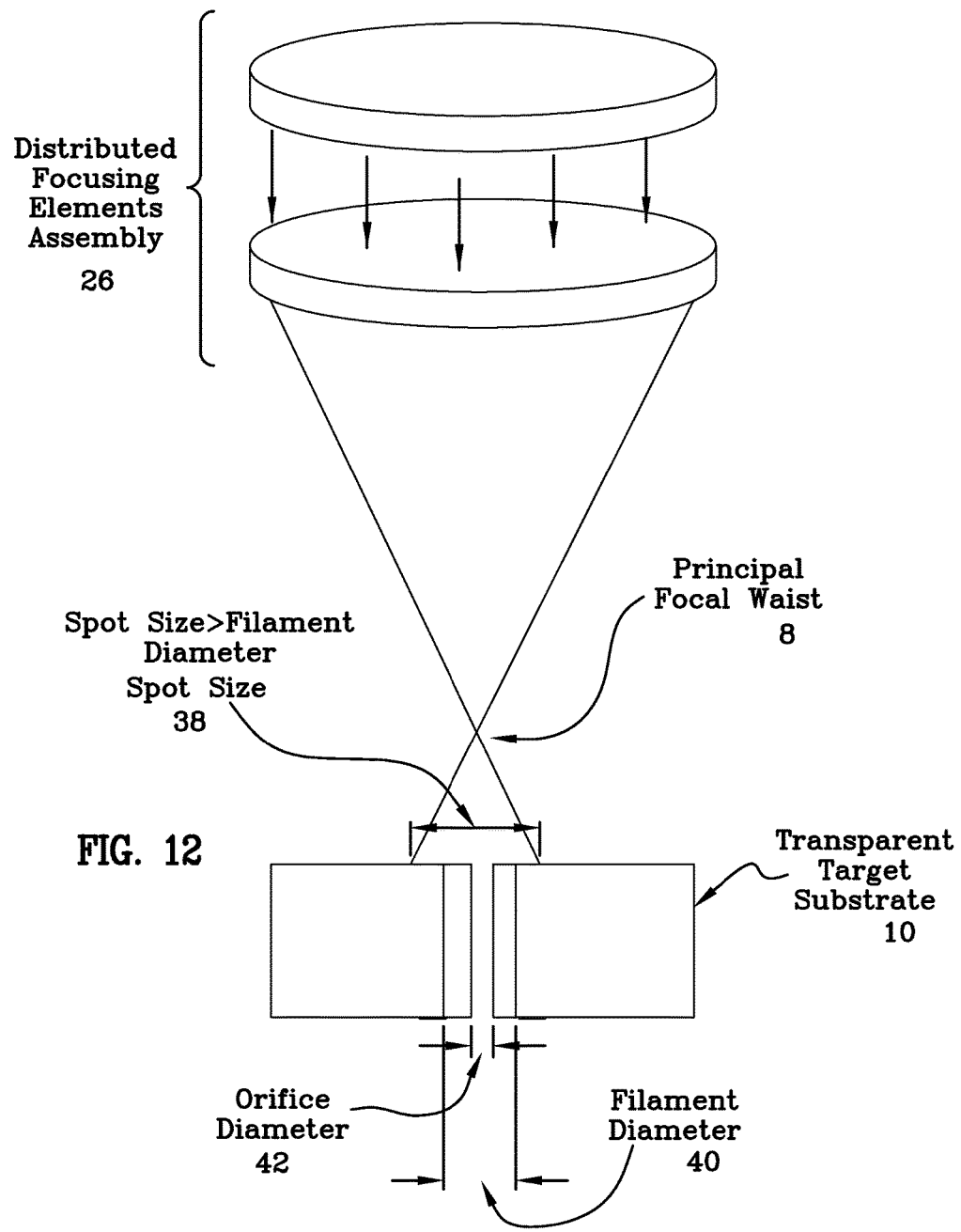
FIG. 12 is a diagrammatic view of the present invention utilizing a distributed focus lens arrangement.

It is to be noted that there is also a set of physical parameters that must be met by this photoacoustic compression drilling process. Looking at FIGS. 11 and 12 it can be seen that the beam spot diameter 38>the filament diameter 40>the orifice diameter 42. Additionally the distributed beam's primary focal waist 8 is never in or on the surface of the target material 10 into which a filament is created.

The location of the principal focal waist 8 is generally in the range of 500 microns to 300 mm off of the desired point of initiation. This is known as the energy dump distance 32. It also is determined by the creation of an empirical table tailored for each transparent material, the physical configuration and characteristics of the target as well as the laser parameters. It is extrapolated from the table created by the method noted above.

Figure 17:
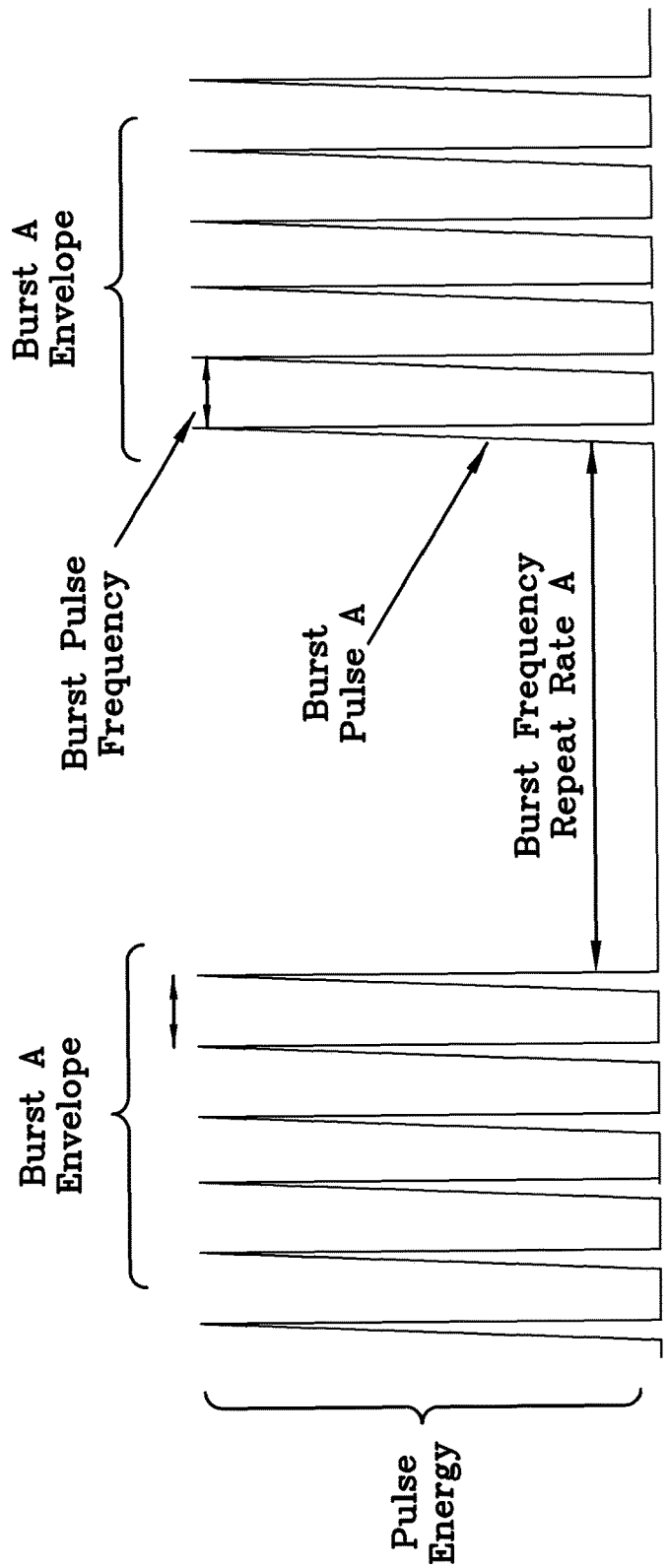
FIGS. 17-19 show three various configurations of the distribution of laser energy.
Figure 18:
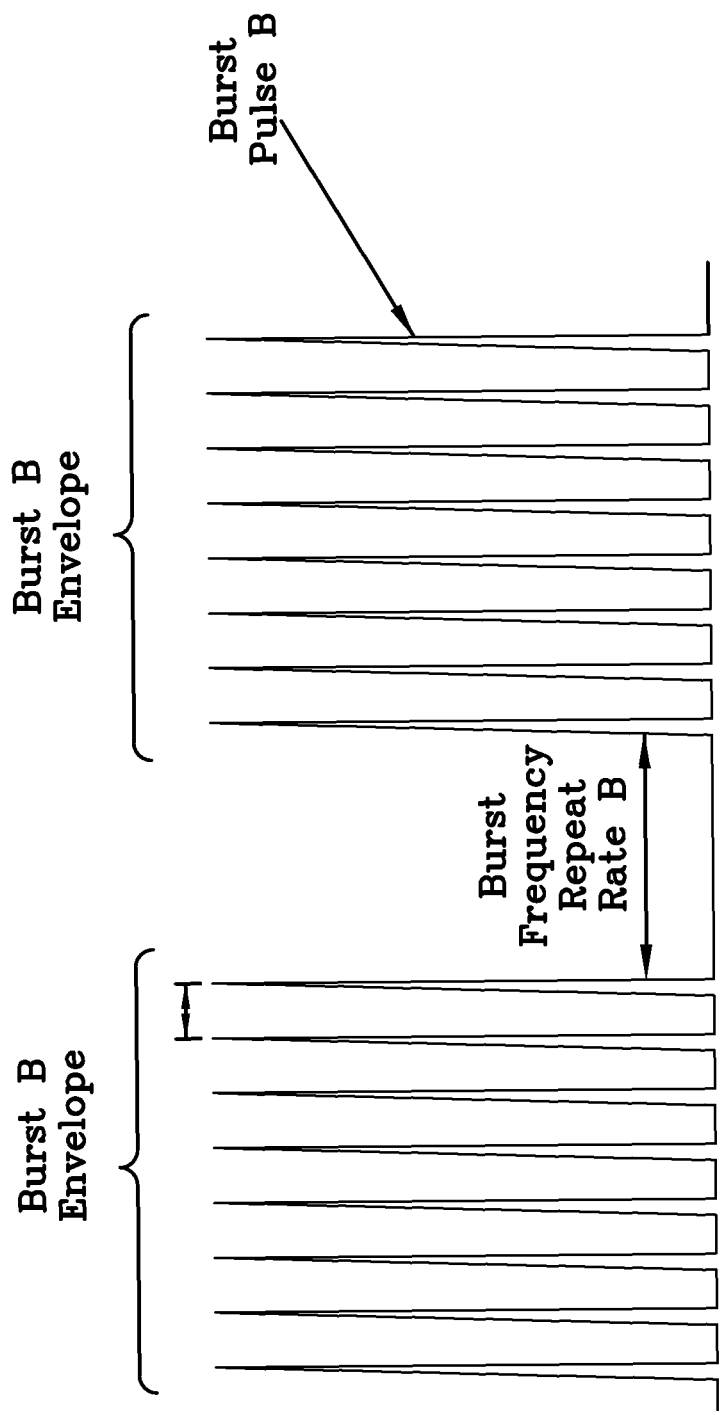
Figure 19:
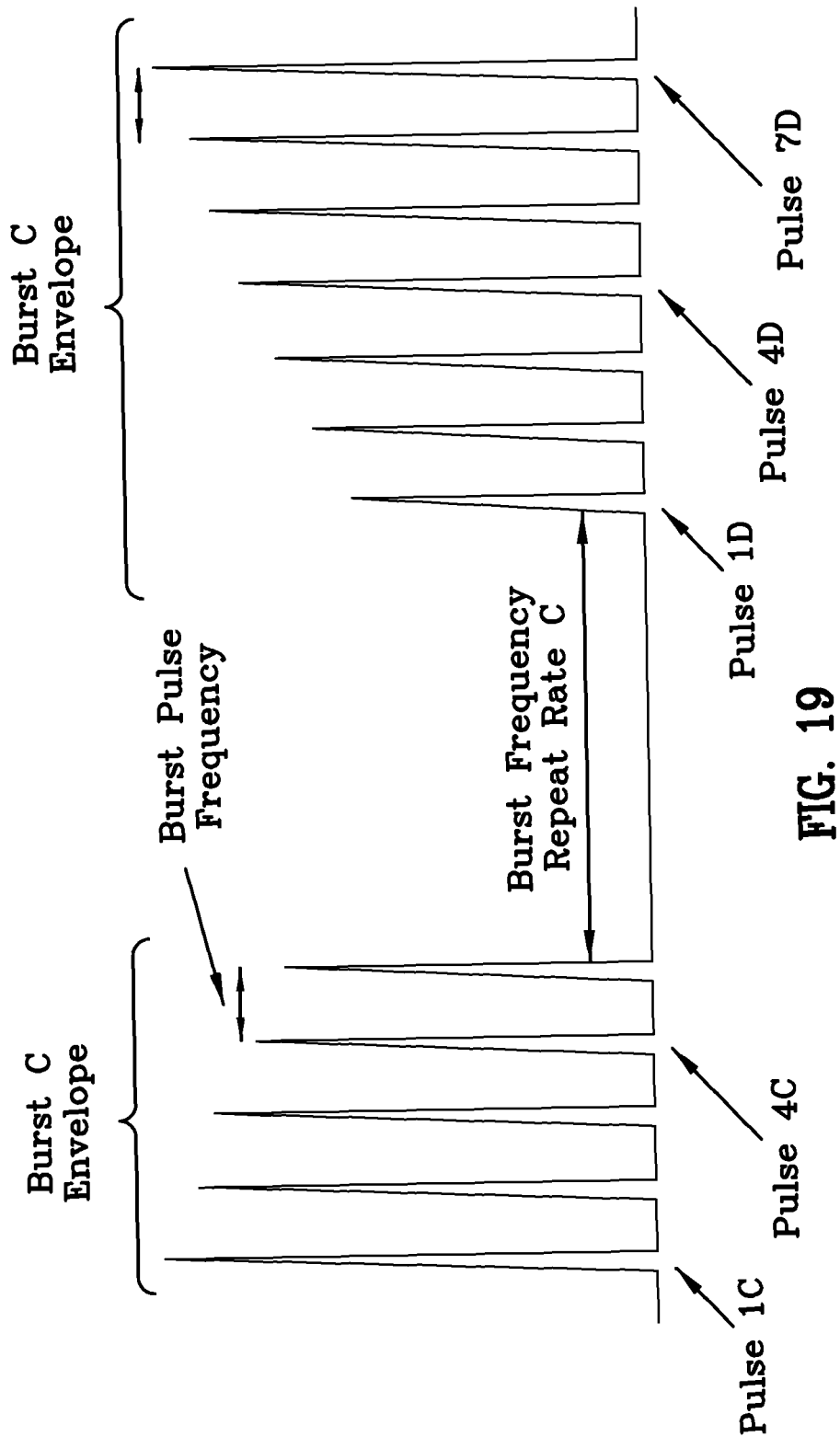

The laser beam energy properties are as follows: a pulse energy in the beam between 0.5 μJ to 1000 μJ, and, the repetition rate from 1 Hz to 2 MHz (the rep rate defines the speed of sample movement and the spacing between neighboring filaments). The diameter and length of the filament may be adjusted by changing the temporal energy distribution present within each burst envelope. FIGS. 17-19 illustrate examples of three different temporal energy distributions of a burst pulsed laser signal. The rising and falling burst envelope profiles of FIG. 19 represent a particularly useful means of process control especially well adapted for removing thin metal layers from dielectric materials.

Looking at FIGS. 13-16 collectively, the mechanism of the present invention can best be illustrated. Herein, burst picosecond pulsed light is used because the total amount of energy deposited in the target material is low and photoacoustic compression can proceed without cracking the material, and less heat is generated in the target material thus efficient smaller packets of energy are deposited in the material so that the material can be raised incrementally from the ground state to a maximally excited state without compromising the integrity of the material in the vicinity of the filament.

The actual physical process occurs as described herein. The principal focal waist of the incident light beam of the pulsed burst laser is delivered via a distributed focusing element assembly to a point in space above or below (but never within) the target material in which the filament is to be created. This will create on the target surface a spot as well as white light generation. The spot diameter on the target surface will exceed the filament diameter and the desired feature (orifice, slot, etc.) diameter. The amount of energy thus incident in the spot on surface being greater than the critical energy for producing the quadratic electro-optic effect (Kerr effect—where the change in the refractive index of the material is proportional to the applied electric field) but is lower that the critical energy required to induce ablative processes and more explicitly below the optical breakdown threshold of the material. Self-focusing occurs above a critical power that satisfies the relationship whereby the power is inverse to the product of the real and complex indices of refraction for the target material. Photoacoustic compression proceeds as a consequence of maintaining the required power in the target material over time scales such that balancing between the self-focus condition and the optical breakdown condition can be maintained. This photoacoustic compression is the result of a uniform and high power filament formation and propagation process whereby material is rearranged in favor of removal via ablative processes. The extraordinarily long filament thus produced is fomented by the presence of spatially extended secondary foci created by the distributed focusing element assembly, maintaining the self focusing effect without reaching optical breakdown. In this assembly, a large number of marginal and paraxial rays converge at different spatial locations relative to the principal focus. These secondary foci exist and extend into infinite space but are only of useful intensity over a limited range that empirically corresponds to the thickness of the target. This is done by focusing the energy of the second foci at a lower level below the substrate surface but at the active bottom face of the filament event. This allows the laser energy access to the bulk of the material while avoiding absorption by plasma and scattering by debris.

Figure 13:
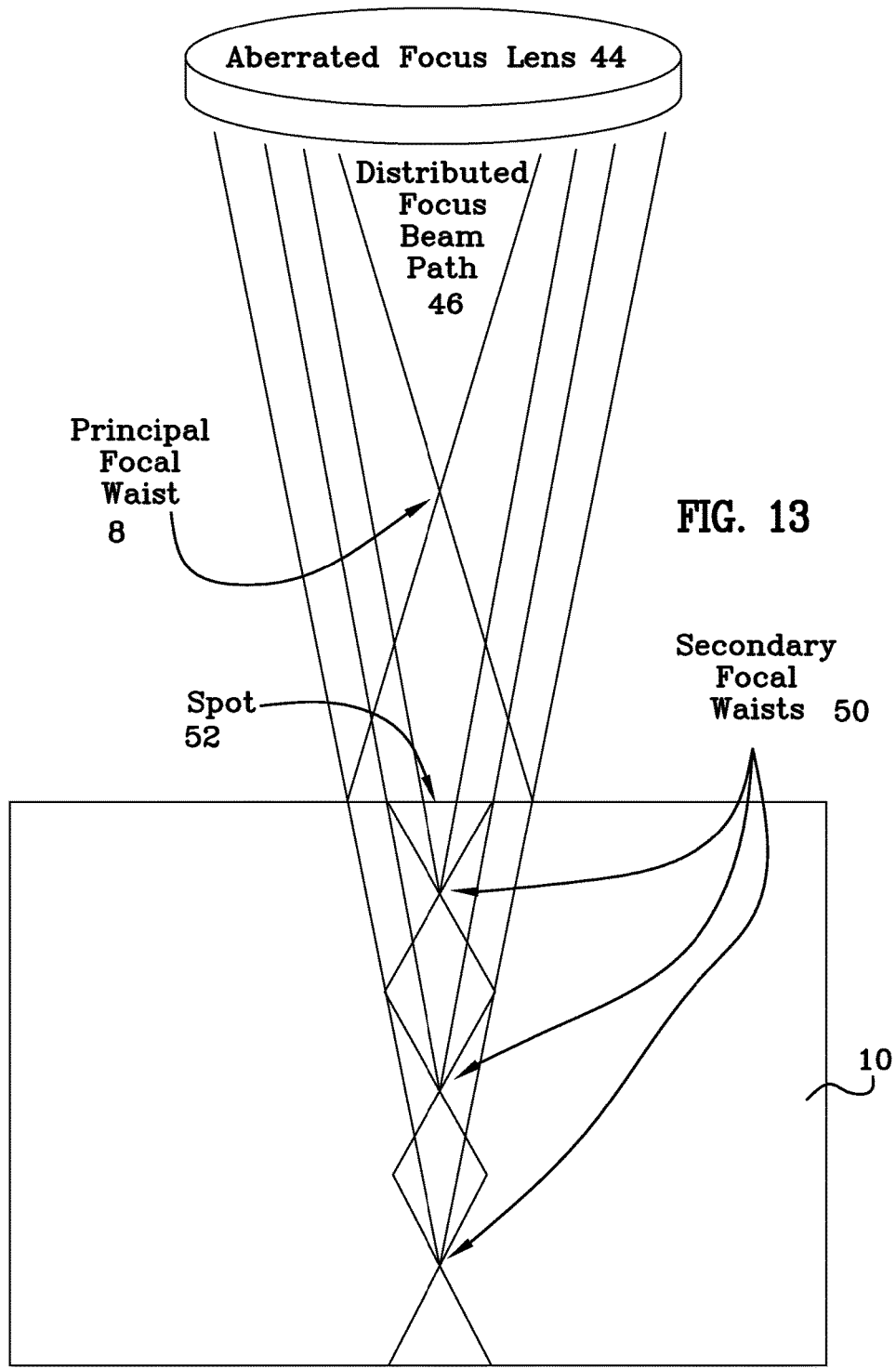
FIG. 13 is a diagrammatic view of the present invention utilizing a distributed focus lens arrangement and the distribution of focal waists where the principal focus is above the target.
Figure 14:
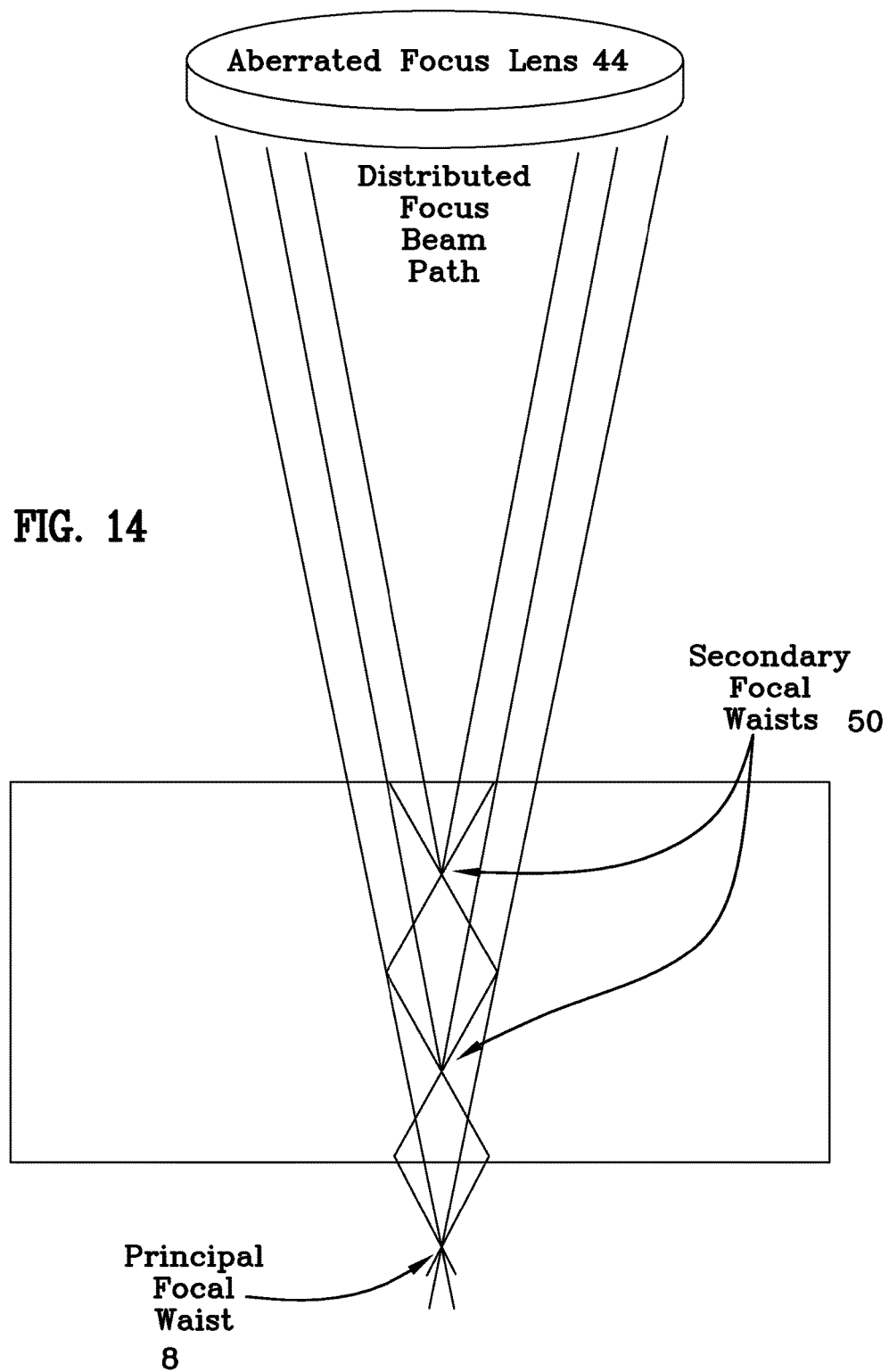
FIG. 14 is a diagrammatic view of the present invention utilizing a distributed focus lens arrangement and the distribution of focal waists where the principal focus is below the target.
Figure 15:
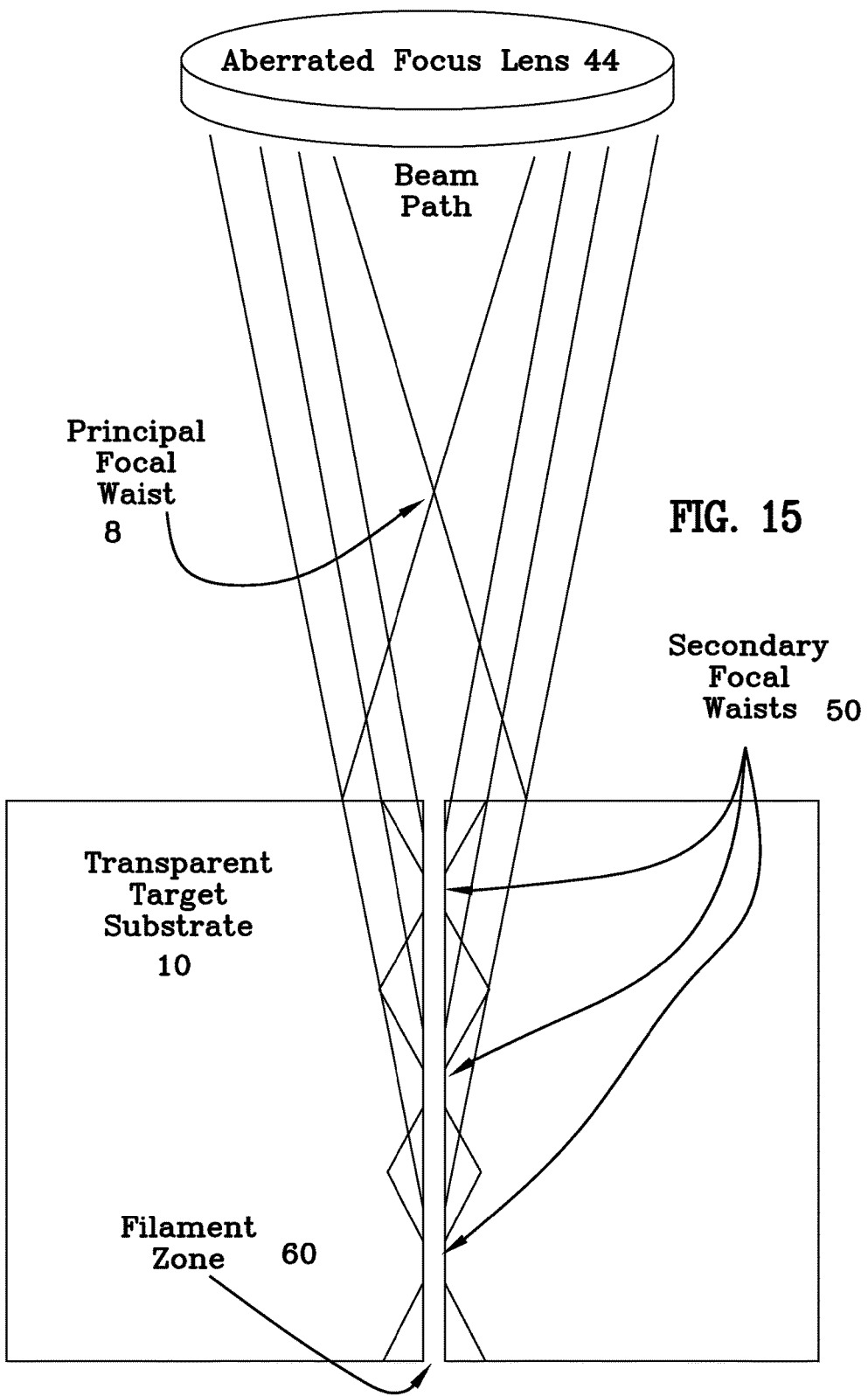
FIG. 15 is a diagrammatic view of the present invention of FIG. 13 wherein the orifice has been drilled.

The distributed focal element assembly can be a single aberrated focal lens placed in the path of the incident laser beam to develop what appears to be an unevenly distributed focus of the incident beam into a distributed focus beam path containing a principal focal waist and a series of linearly arranged secondary focal waists (foci). The alignment of these foci is collinear with the linear axis of the orifice 42. Note that the principal focal waist 8 is never on or in the target material 10. In FIG. 13 the principal focal waist is above the target material and in FIG. 14 it is below the target material 10 as the orifice 42 may be initiated above or below the principal focal waist 8 by virtue of the symmetric and non-linear properties of the focused beam. Thus a beam spot 52 (approximately 10 μm distance) resides on the surface of the target 10 and the weaker secondary focal waists collinearly reside within the target because the material acts as the final optical element creating these focal points as the electric field of the laser alters the indices of refraction of the target. This distributed focus allows the amount of laser energy to be deposited in the material so as to form a filament line or zone 60. With multiple linear aligned foci and by allowing the material to act as the final lens, the target material when bombarded with ultrafast burst pulse laser beams, undergoes numerous, successive, localized heating which thermally induce changes in the material's local refractive index (specifically, the complex index) along the path of the linear aligned foci causing a lengthy untapered filament 60 to be developed in the target followed by an acoustic compression wave that annularly compresses the material in the desired region creating a void and a ring of compressed material about the filamentation path. Then the beam refocuses and the refocused beam combined with the energy at the secondary focal waists maintains the critical energy level and this chain of events repeats itself so as to drill an orifice capable of a 1500:1 aspect ratio (length of orifice/diameter of orifice) with little to no taper and an entrance orifice size and exit orifice size that are effectively the same diameter. This is unlike the prior art that focuses the energy on the top surface of or within the target material resulting in a short filamentation distance until the optical breakdown is reached and filamentation degrades or ceases.

Figure 16:
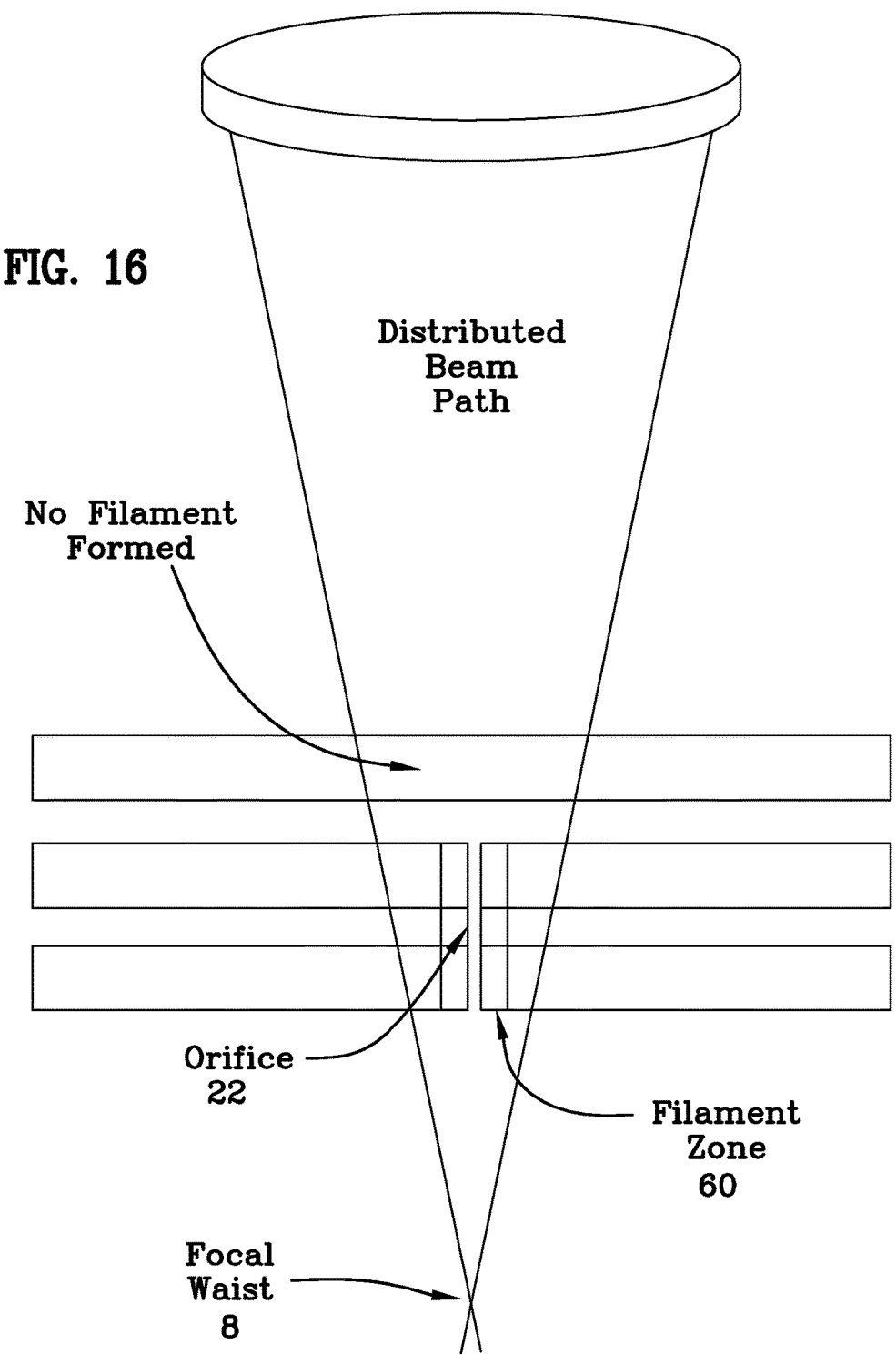
FIG. 16 is a diagrammatic view of the present invention utilizing a distributed focus lens arrangement and the distribution of focal waists where the principal focus is below multiple targets.

FIG. 16 illustrates the drilling of orifices in the bottom two of three planar targets 10 in a stacked configuration with an air gap between them wherein the principal focal waist 8 is positioned below the final target 10. The hole can be drilled from the top or the bottom or the middle of a multiple layer setup, but the drilling event always occurs the same distance from the principal focal waist if the same lens set and curvature is used. The focal waist is always outside of the material and never reaches the substrate surface.

The method of drilling orifices is through photoacoustic compression is accomplished by the following sequence of steps:

1. passing laser energy pulses from a laser source through a selected distributive-focus lens focusing assembly;
2. adjusting the relative distance and or angle of said distributive-focus lens focusing assembly in relation to a laser source so as to focus the laser energy pulses in a distributed focus configuration to create a principal focal waist and at least one secondary focal waist;
3. adjusting the principal focal waist or the target such that the principal focal waist will not reside on or in the target that is being machined;
4. adjusting the focus such that the spot of laser fluence on the surface of the target that is located below or above said principal focal waist, has a diameter that is always larger than a diameter of a filamentation that is formed in the target;
5. adjusting the fluence level of the secondary focal waists are of sufficient intensity and number to ensure propagation of a photoacoustic compressive machining through the desired volume of the target;
6. applying at least one burst of laser pulses of a suitable wavelength, suitable burst pulse rep rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater than the critical energy level required to initiate and propagate photoacoustic compression machining, yet is lower than the threshold critical energy level required to initiate ablative machining; and,
7. stopping the burst of laser pulses when the desired machining has been completed.

As mentioned earlier, there may be specific orifice configurations wherein a tapered entrance to the orifice may be desired. This is accomplished by initiation of the orifice with a laser fluence level that is capable of ablative machining for a desired distance and completing the drilling with a laser fluence level below the critical level for ablative machining yet above the critical level for photo-acoustic machining to the desired depth in that material. This type of orifice formation may also utilize the application of a removable sacrificial layer on the surface of the target. This would allow the formation of the ejecta mound onto the sacrificial layer such that the ejecta mound could be removed along with the sacrificial layer at a later time.

Such an orifice drilled by a hybrid ablative and photoacoustic compression method of machining would be performed through the following steps, although the application of the sacrificial layer need be utilized and if utilized need not occur first. The steps are:

1. applying a sacrificial layer to at least one surface of a target;
2. passing laser energy pulses from a laser source through a selected distributive-focus lens focusing assembly;
3. adjusting the relative distance and or angle of said distributive-focus lens focusing assembly in relation to a laser source so as to focus the laser energy pulses in a distributed focus configuration to create a principal focal waist and at least one secondary focal waist;
4. adjusting the principal focal waist or the target such that the principal focal waist will not reside on or in the target that is being machined;
5. adjusting the focus such that the spot of laser fluence on the surface of the target that is located below or above said principal focal waist;
6. adjusting the spot of laser fluence on the surface of the target such that it has a diameter that is always larger than the diameter of a filamentation that is to be formed in the target;
7. ensuring the fluence level of the secondary focal waists are of sufficient intensity and number to ensure propagation of a photoacoustic compressive machining through the desired volume of the target;
8. applying at least one burst of laser pulses of a suitable wavelength, suitable burst pulse rep rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater that the critical energy level required to initiate ablative machining to the desired depth and thereinafter the fluence energy at the bottom of the ablatively drilled orifice is greater than the critical energy level to initiate and propagate a filamentation and photoacoustic compression machining, yet is lower than the threshold critical energy level required to initiate ablative machining; and,
9. stopping the burst of laser pulses and filamentation when the desired machining has been completed.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following chart details the ranges of the various system variables used to accomplish the drilling of uniform orifices in any of a plethora of transparent materials.

| Laser Properties | |
|---|---|
| Wavelength | 5 microns or less |
| Pulse width | 10 nanoseconds or less |
| Freq (laser pulse repetition rate) | 1 Hz to 2 MegaHz |
| Ave power | 200 - 1 watt |
| Number of sub pulses per burst | 1 to 50 |
| Sub pulse spacing | 0.1 femtosecond to 10 microsecond |
| Pulse energy | .5 µJ to 10 micro Joules (µJ) |
| | (Ave power/rep rate) watts/1/sec |
| Orifice Properties | |
| Min Orifice Diameter | .5 microns |
| Max Orifice Diameter | 5 mm |
| Max Orifice Depth | 10 mm in borosilicate glass |
| Typical Aspect Ratio | 1500:1 |
| Max Aspect Ratio | 2500:1 |
| Aberrated lens ratio | where the Cx:Cy ratio of the lenses are (−5 to 4,000) |
| Orifice Sidewall Smoothness (Material Independent) | <5 micron ave. roughness (e.g Si, SiC, SiN, GaAs, GaN, InGaP) |
| Orifice Side Wall Taper (Material Independent) | Negligible across 10,000 micron depth |
| Final Optical Assembly | |
| Ratio of Lens Focal Lengths | +300 to −300 |
| Lens Optical Efficiency | 50 to 99% |
| Beam Properties | |
| Focal Distribution | −5 to 4,000 |
| $M^2$ | 1.00-5.00 |

As noted earlier the parameters above vary with the target. In the way of an operational exemplary, to drill a 3 micron hole 2 mm deep in a transparent substrate the following apparatus and parameters would be used: a 1064 nanometer wavelength laser; 65 watts of average power; 10 µJ pulse energy; 15 subpulses per burst; and a 1 MHz rep rate. This would be focused with an aberrated lens delivering distributed foci over 2 mm of space (filament active zone is 2 mm long) focusing 0.5 microns to 100 mm above the top surface depending upon the material.

The Laser Machining System

Figure 20:
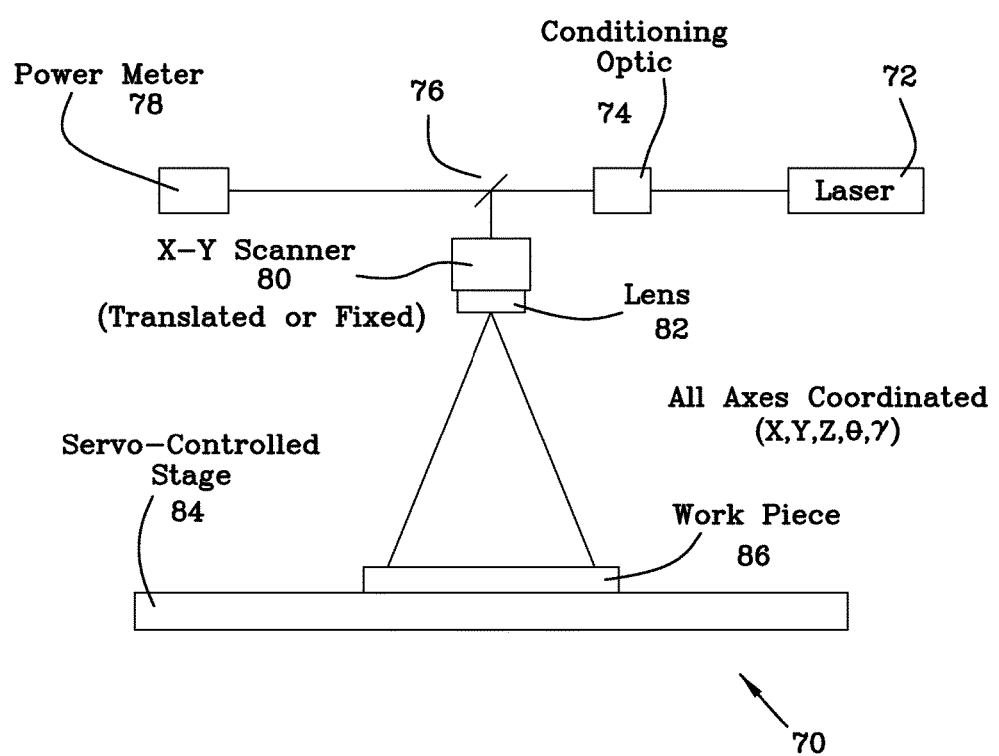
FIG. 20 is a diagrammatic representation of a laser machining system.

It is well known in the art that there are several types of laser machining systems currently available. All the laser machining systems have at least two things in common: they change the location of the incident laser beam on the work piece and they allow for the adjustment of the various laser focusing, power and delivery parameters. The system may move the work piece about the laser beam (for example, through a table translatable in the X-Y plane), may move the laser beam about the work piece (for example, through steering mirrors) or may utilize a combination of both techniques. FIG. 20 represents an example of a laser machining system 70 capable of forming filaments in the glass substrate of HDD platters or sheets. It includes an ultrafast laser 72 capable of supplying a train of burst-mode pulses, preferably with a pulse width less than 100 picoseconds, equipped with a suitable collection of beam steering optics, such that the laser beam can be delivered to a multi-axis rotation and translation stage including: a rotational stage in the XY plane (theta, $\theta$), a 3D XYZ translational stage, and an axis for tipping the beam or the part relative to the Y axis (gamma, $\gamma$) in a coordinated control architecture. In the example embodiment shown, the beam is manipulated by conditioning optic 74 (e.g. a positive or negative lens or combination of lenses capable of delivering a weakly focused spot that can be further conditioned or manipulated), beam sampling mirror 76, power meter 78, X-Y scanner 80, final focusing lens 82, and servo-controlled stage 84 for positioning workpiece 86 (HDD platter substrate.) Control and processing unit 88, which is described in further detail below, is employed for the control of the laser filamentation and cutting system embodiment 70 disclosed herein. Filament position and depth may be controlled by an auto-focus configuration (e.g. using a position-sensing device) that maintains a constant working distance.

Figure 21:
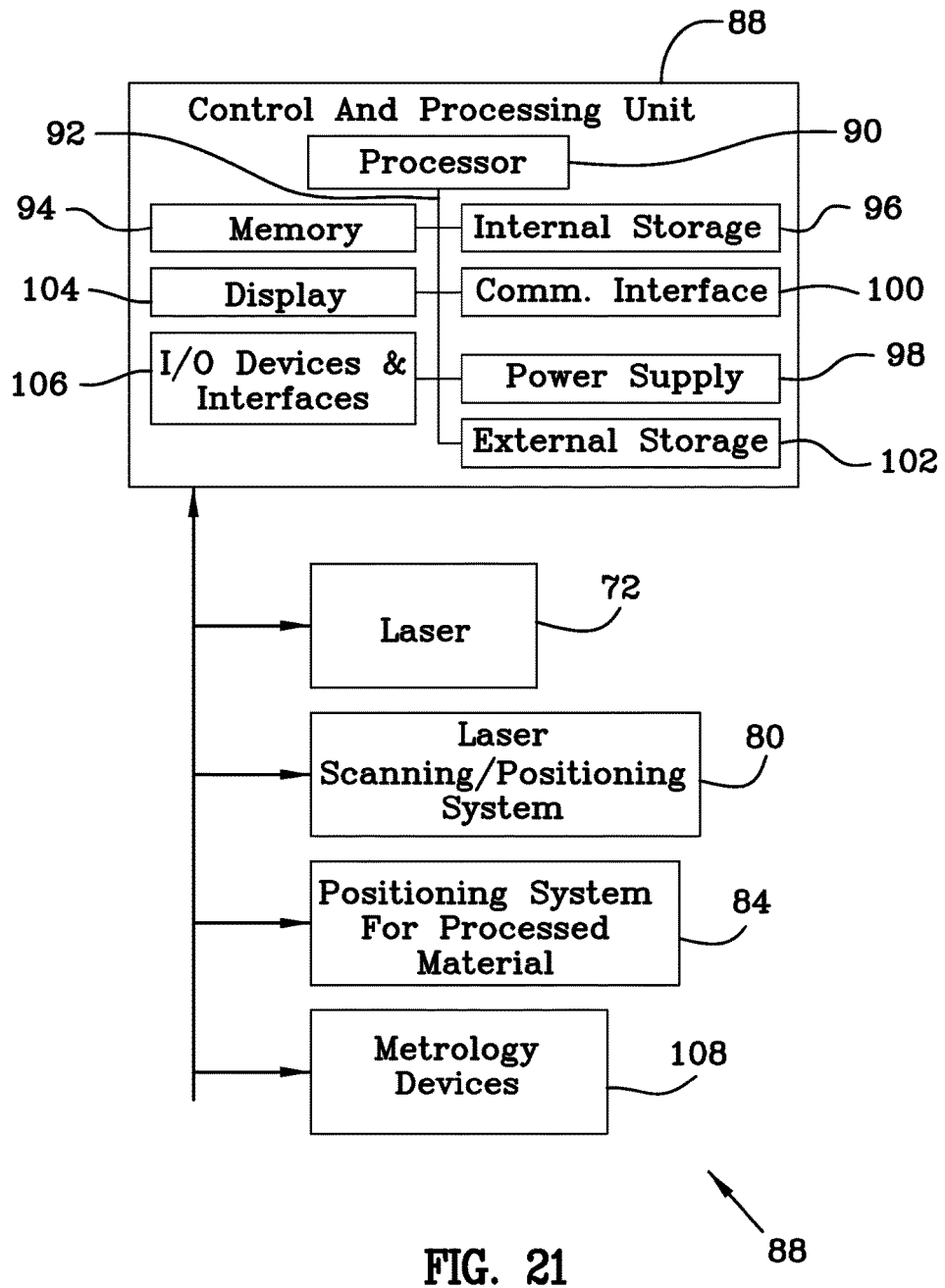
FIG. 21 is a diagrammatic representation of the control and processing unit for the laser machining system of FIG. 20.

FIG. 21 provides an example implementation of control and processing unit 88, which includes one or more processors 90 (for example, a CPU/microprocessor), bus 92, memory 94, which may include random access memory (RAM) and/or read only memory (ROM), one or more optional internal storage devices 96 (e.g. a hard disk drive, compact disk drive or internal flash memory), a power supply 98, one more optional communications interfaces 100, optional external storage 102, an optional display 104, and various optional input/output devices and/or interfaces 106 (e.g., a receiver, a transmitter, a speaker, an imaging sensor, such as those used in a digital still camera or digital video camera, an output port, a user input device, such as a keyboard, a keypad, a mouse, a position tracked stylus, a position tracked probe, a foot switch, and/or a microphone for capturing speech commands). Control and processing unit 88 is interfaced with one or more of laser system 72, laser scanning/position system 80, the servo-controlled stage 84 (positioning system for the workpiece HDD platter substrate), and one or more metrology devices or systems 108, such as one or more metrology sensors or imaging devices.

Although only one of each component is illustrated in FIG. 21, any number of each component can be included in the control and processing unit 88. For example, a computer typically contains a number of different data storage media.

Furthermore, although bus 92 is depicted as a single connection between all of the components, it will be appreciated that the bus 92 may represent one or more circuits, devices or communication channels which link two or more of the components. For example, in personal computers, bus 92 often includes or is a motherboard.

In one embodiment, control and processing unit 88 may be, or include, a general purpose computer or any other hardware equivalents. Control and processing unit 88 may also be implemented as one or more physical devices that are coupled to processor 90 through one of more communications channels or interfaces. For example, control and processing unit 88 can be implemented using application specific integrated circuits (ASICs). Alternatively, control and processing unit 88 can be implemented as a combination of hardware and software, where the software is loaded into the processor from the memory or over a network connection.

Control and processing unit 88 may be programmed with a set of instructions which when executed in the processor 90 causes the system to perform one or more methods described in the disclosure. Control and processing unit 88 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's) and field-programmable gate arrays (FPGAs).

Figure 22:
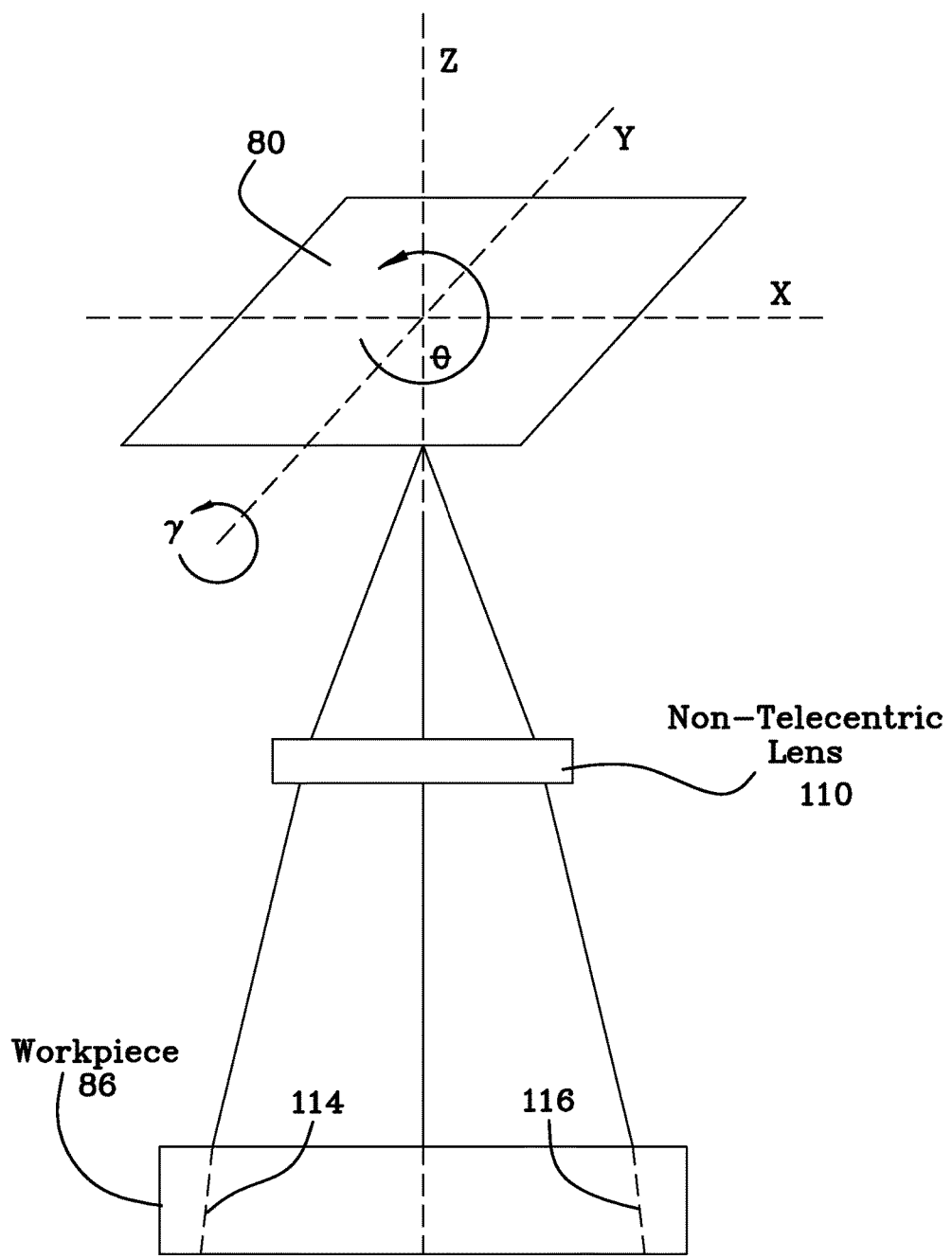
FIGS. 22 and 23 illustrate the X-Y scanner, using non-telecentric and telecentric lenses.
Figure 23:
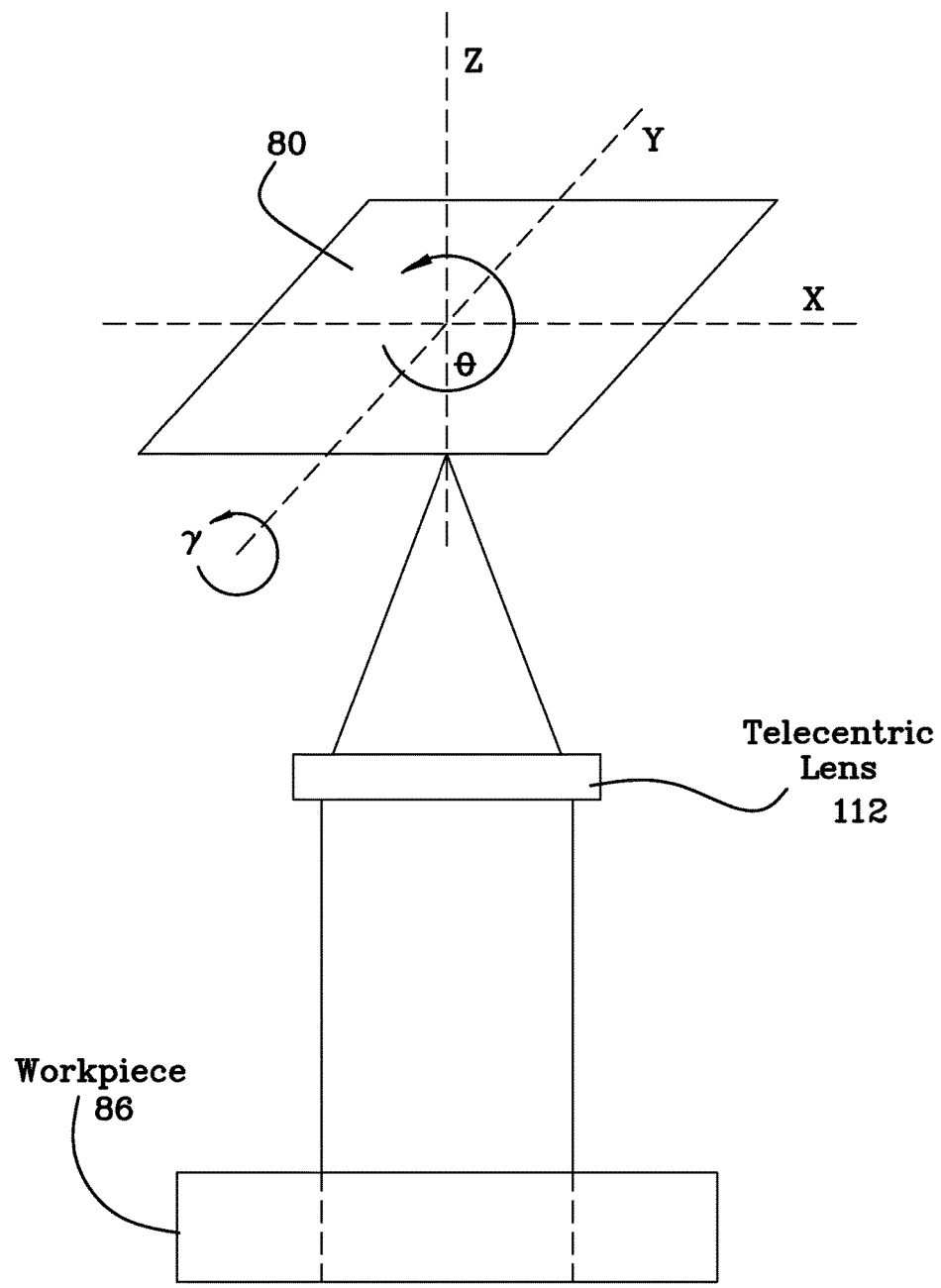

FIGS. 22 and 23 illustrate example embodiments showing the ability to control multiple axes via a control of the X-Y scanner 80, using non-telecentric 110 lens (FIG. 22) and telecentric lens 112 (FIG. 23). In the case of a non-telecentric lens 110, angled filament paths can be created by the natural distortion present in a non-field-corrected lens. Rotation about the Y (γ, gamma) axis may be performed to provide angled filament modified zones (114, 116) within workpiece 86 using normally incident light. It is to be understood that other optical configurations are possible.

Figure 24:
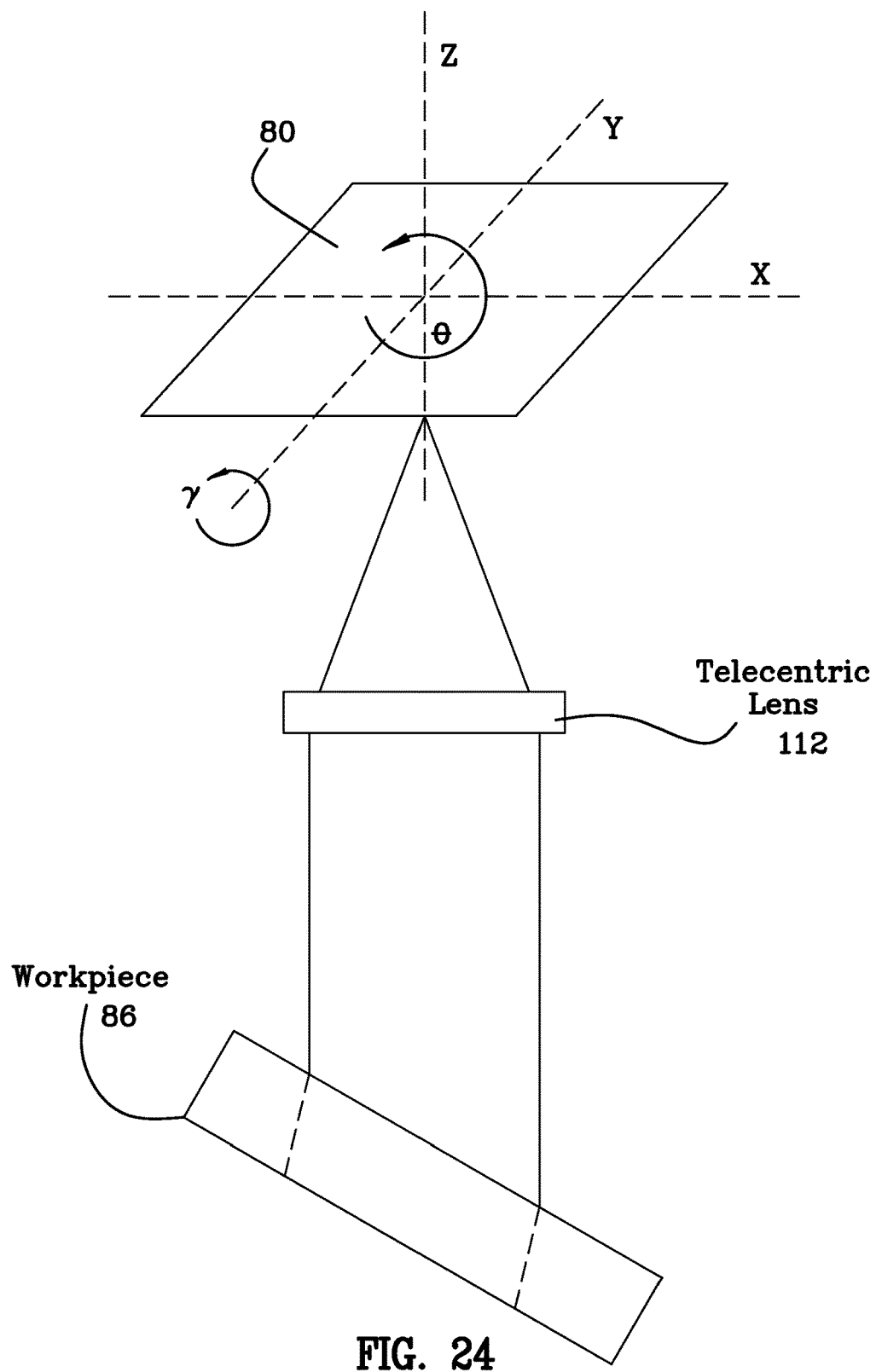
FIG. 24 illustrates an alternative embodiment producing filaments that are angled relative to the workpiece material's surface.

FIG. 24 illustrates an alternative embodiment in which the servo controlled stage 84 (not illustrated) supporting the workpiece 86 is rotated to produce filaments that are angled relative to the workpiece material's surface. This embodiment is configured to present a tilted sample with respect to the beam incidence angle for producing results similar to apparatus embodiments employing a scan lens.

Figure 25:
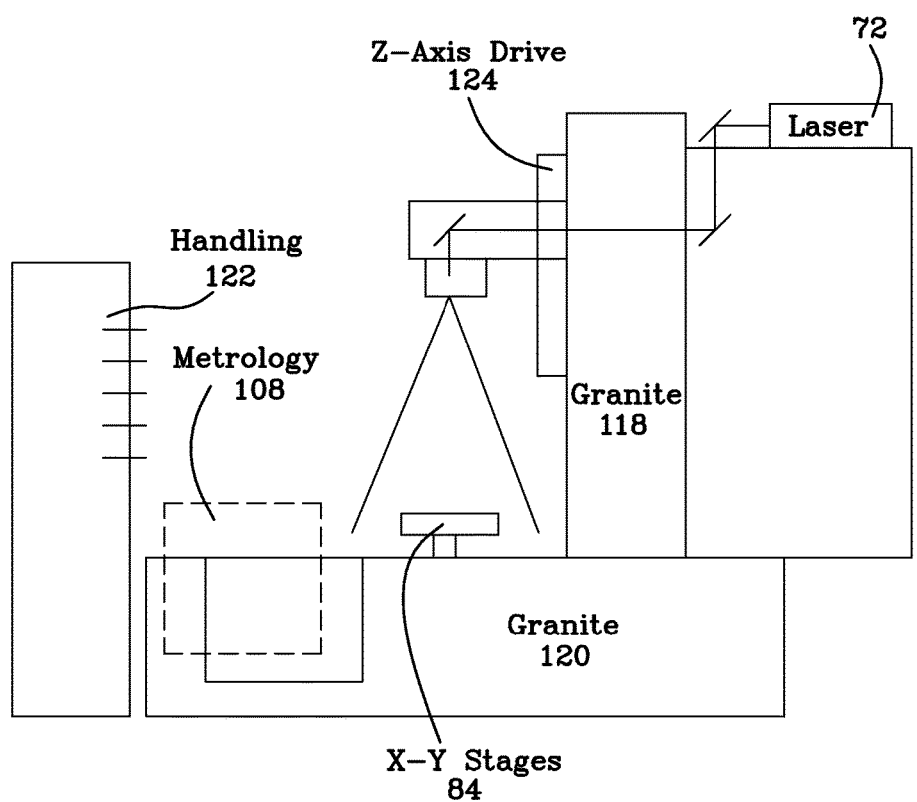
FIG. 25 illustrates the layout of an example laser system suitable for part singulation.

FIG. 25 illustrates the layout of an example laser system suitable for part singulation. Laser 72 is capable of delivering burst pulses, for example, with energies in the range of approximately 1 µJ-50 mJ, at a repetition rate of up to approximately 2.5 MHz.

Granite riser 118 is designed to be a reactive mass for dampening mechanical vibrations, as is commonly used in industry. This could be a bridge on which the optics above the stage can translate along one axis, X or Y relative to the stage, and in coordination with it. Granite base 120 provides a reactive mass that may support any or all components of system. In some embodiments, handling apparatus 122 is vibrationally decoupled from the system for stability reasons.

Z axis motor drive 124 is provided for translating the optics (conditioning and focusing and scan optics if needed) in the Z axis relative to the servo controlled X-Y stage 84. This motion can be coordinated with the XY stage 84 and X or Y motion in the overhead granite bridge, and the XY motion of the stage on the granite base 120, which holds the sample material to be processed.

Stage 84 includes, for example, XY and Theta stages with a tilt axis, gamma ("yaw"). The motion of stages 84 is coordinated by a control computing system, for example, to create a part shape desired from a larger mother sheet. Metrology device 108 provides post processing or preprocessing (or both) measurements, for example, for mapping, sizing, and/or checking the quality of the edges post cut.

Figure 25A:
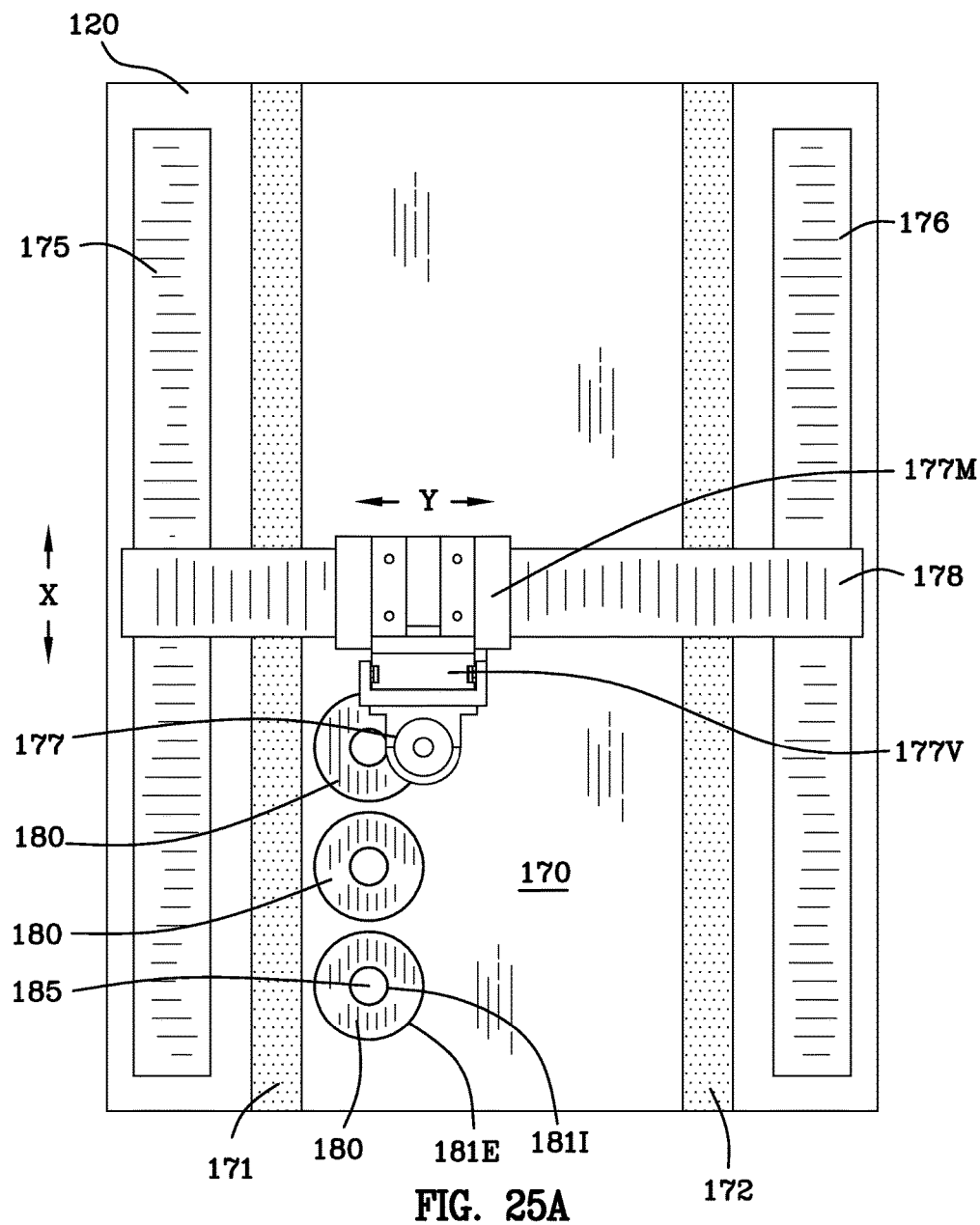
FIG. 25A is a schematic top view of an example laser system for cutting glass hard disk drive platters using laser machining.

FIG. 25A is a schematic top view of an example laser system for cutting glass hard disk drive platters 180 using laser machining X-Y motion of the laser head 177 is illustrated in FIG. 25A wherein the laser head 177 is illustrated schematically above glass substrate 170. Glass substrate 170 is supported by beams 171, 172 above a granite (or other dimensionally stable) support 120. Rails 175, 176 support the movable arm 178 which is movable in the X direction along the rails 175, 176 as illustrated in FIG. 25A. Movable arm 178 is driven by a motor and a controller which precisely positions the movable arm 178 in the X direction. Similarly, the laser head is driven by a motor and a controller and is precisely movable and positioned along the movable arm 178 in the Y direction as illustrated in FIGS. 25A and 25B. FIG. 25 B is a schematic side view of the example laser system for cutting glass hard disk drive platters illustrated in FIG. 25A.

Movable arm 178 includes rail means and the laser head 177 includes a motor 177M or other means for positioning the laser head 177 in the Y direction. Further the laser head in movable in the Z direction for adjusting the beam waists as desired. Vertical rail 177V enables movement of the laser head 177 in the vertical direction (the Z direction). Still further, it is understood that a selected distributive-focus lens may be adapted for use with the laser head 177. Glass hard disk drive platters 180 are illustrated in FIG. 25A and in FIG. 28.

Figure 28:
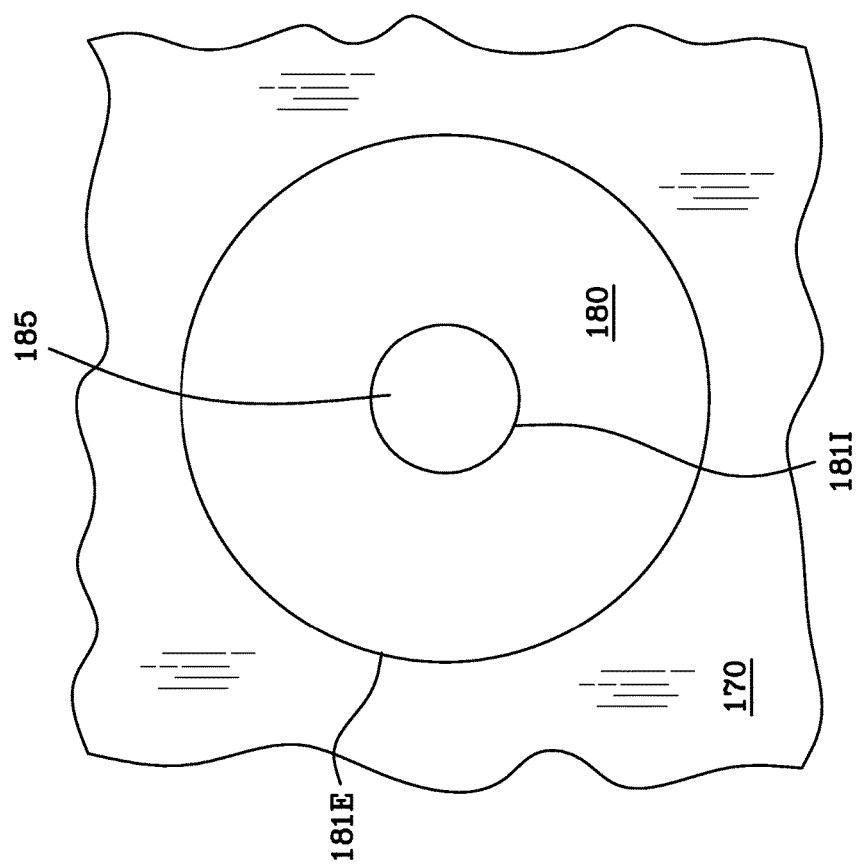

FIG. 28 shows the glass substrate 170 from which glass hard disk drive platters 130 are cut as illustrated in FIGS. 25A and 25B. The outer scribed circular line 181E is illustrated and the inner scribed circular line 181I is illustrated.

FIGS. 26(a)-(d) show the angled cut out approach for making internal features with angled edges requiring no post singulation processing to achieve the desired angular result.

Figure 26A:
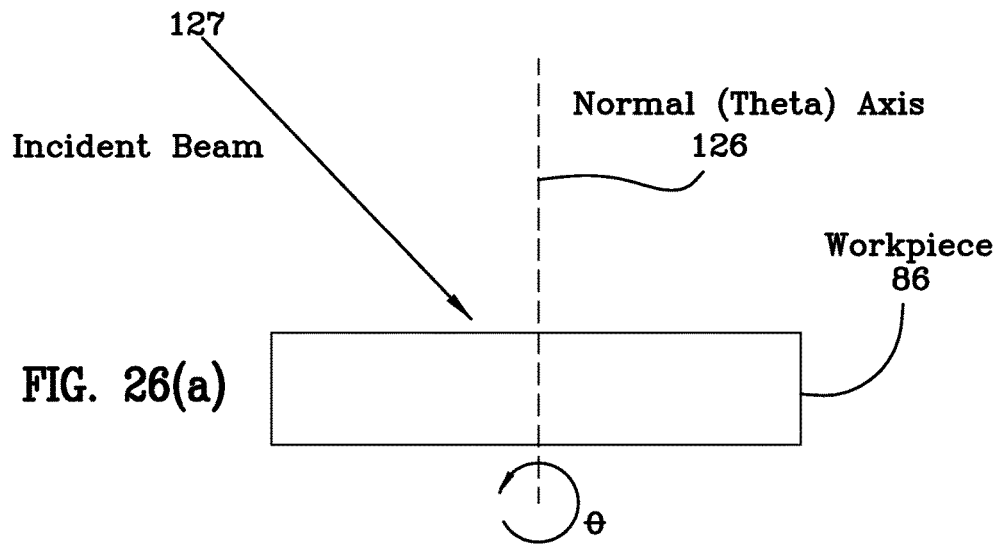
FIG. 26 (a-d) show the angled cut out approach for making angled edges as shown in FIG. 26 (e)
Figure 26B:
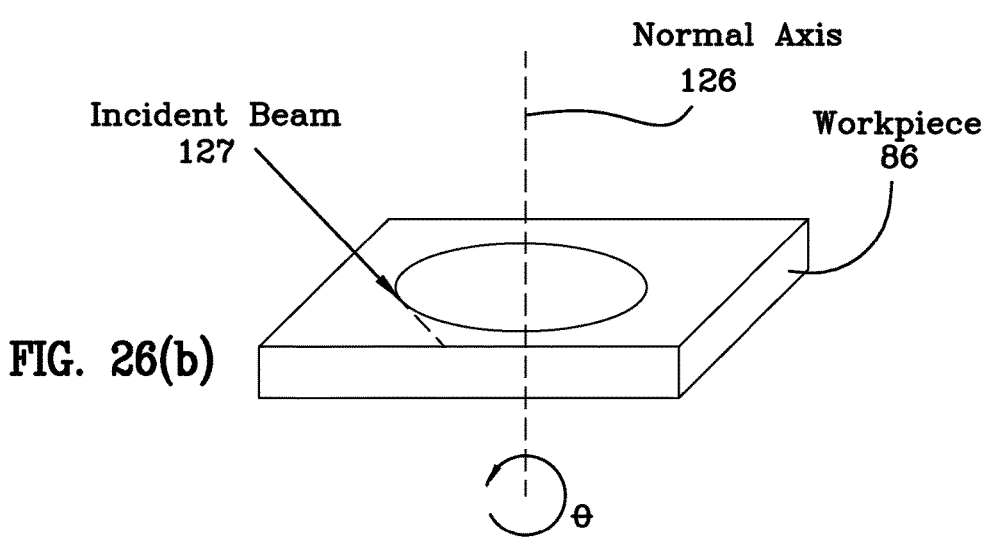
Figure 26C:

In FIGS. 26(a)-(c), the beam track is accomplished via rotation around the theta axis 126 with a fixed incidence angle laser beam 127, equal to the slope desired on the final part edge 128. This non-limiting embodiment enables angled cutting and translation of the rotary stage as an apparatus to support the creation of complex cutouts via filament arrays.

Figure 26D:
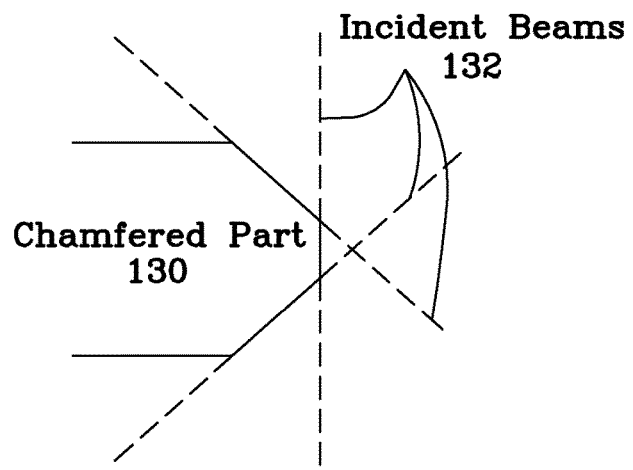

FIG. 26(d) illustrates an example implementation of the formation of a chamfered part 130 via processing with multiple filament forming beams 132 at different angles. It is to be understood that the beam and filament paths can be controlled to form chamfered or bevel edges of various degrees. In the case of concerted (parallel) formation, the beam can be split and directed through optics to achieve multiple beam paths arriving at the target exhibiting angles of incidence other than normal, along with a normally incident beam, such that a three-face edge or chamfer is created.

Figure 26E:
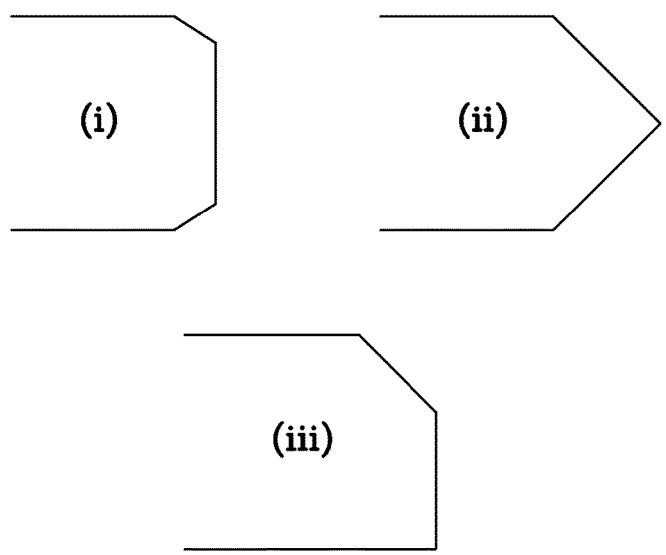

It is to be understood that chamfers can be created with two or more faces, depending, for example, on the degree of splitting tolerated by the process. Some example configurations are illustrated in FIG. 26(e).

In some embodiments, as described below, the laser processing system can be configured such that one laser (with beam splitting optics) can perform both scribing steps simultaneously, provided that the laser has sufficient power. It has been found, for example, that a laser with an average power of approximately 75 W is sufficient to perform all processing steps simultaneously.

The aforementioned apparatus, with multi-axis rotational and translational control, when utilizing filamentation by burst ultrafast laser pulses to accomplish photoacoustic compression machining may be employed for the purpose of bringing the beam on to the work piece(s) at variable focus positions, non-normal angles of incidence and at variable, recipe controlled positions to create curvilinear zones of filament arrays, for the purpose of cutting out closed-form shapes to create products such as glass HDD platters (from magnetic media covered glass substrate) which is presently not possible using the laser ablative machining techniques currently employed. Those skilled in the art will recognize that all of these axes are not required for all applications and that some applications will benefit from having simpler system constructions. Furthermore, it is to understood that the apparatus shown in but one example implementation of the embodiments of the present disclosure, and that such embodiments may be varied, modified or hybridized for a wide variety of substrates, applications and part presentation schemes without departing from the scope of the present disclosure by the device manufacturers.

The HDD Platter Cutting Methods

The preferred embodiment method begins with sheets of prepared HHD platter glass substrate. In disk manufacturing, a thin coating is deposited on both sides of the glass substrate, mostly by a vacuum deposition process called magnetron sputtering. The coating has a complex layered structure consisting of various metallic (mostly non-magnetic) alloys as underlayers, optimized for the control of the crystallographic orientation and the grain size of the actual magnetic media layer on top of them, i.e. the film storing the bits of information. This shallow layer of magnetic material typically is 10-20 nm in depth. On top of it a protective carbon-based overcoat is deposited in the same sputtering process. In post-processing a nanometer thin polymeric lubricant layer gets deposited on top of the sputtered structure by dipping the disk into a solvent solution, after which the disk is buffed by various processes to eliminate small defects and verified by a special sensor on a flying head for absence of any remaining impurities or other defects. Here, the process of coating the glass platters differs slightly in that the coatings are applied to sheets of glass substrate rather than pre cut glass platters that have been edge polished. The coated glass substrate sheets are then cut into platters (that require no edge polishing) from the most geometrically efficient pattern. The platters can then be buffed and verified as above. Alternatively, the coated substrate sheets may be completely processed through buffing and verification before the platters are cut. Regardless of which step in the above process the platters are cut, (before or after the various layered coatings of magnetic media are put onto the glass substrate) the platter cutting method is similar.

The beginning point for the laser machining of circular HDD platters starts with sheets of the glass substrate or the glass substrate that has affixed to it the various layers of coatings necessary to enable a HDD to operate (undercoats, magnetic media, protective overcoats, etc.) and these sheets have been cleaned and polished to an acceptable, operational degree. For both cases, bare substrate or coated substrate, only one circular pass of the burst of laser pulses about the periphery of the platter (and or the center knockout) is necessary to sever the platter from its substrate sheet. For the case where there is a coating on the substrate, the first few pulses in the burst ablate the surface and open up a clean path for the rest of pulses in the burst to penetrate inside the substrate and form a filament for the filamentation process. The beauty and novelty of this technique enables performance of two different processes of surface ablation and volume filamentation (scribing) in a single pass.

Any transparent substrate having a non transparent coating applied to either of its faces that are thin enough (i.e. the 10 micron or less range) can be cut by the presently described method. When the laser beam is incident on the top surface, ablation will take place because there is not enough non linear absorption in the coatings to allow for the creation of a filament. This ablation will occur quickly within only a few laser pulses, and then the laser beam travels down to the transparent glass substrate so as to heat that surface and begin the self focusing effect so as to form a filament that cuts the glass substrate by photoacoustic compression. There is no need to refocus the laser beam or adjust any of the beam's parameters. At the interface between the glass substrate and the thin coatings at the bottom of the sheet, a thermal cloud of free electrons will be created that will cause the thin coatings to cleanly "pop off" or vaporize from the glass substrate surface leaving essentially no ejecta material or debris on the surface of the substrate that is larger than a few nanometer in size. Depending on the amount of laser fluence at the interface of the glass platter and the coatings on the bottom face, ablative machining rather than vaporization may occur here as well. This will not require additional surface polishing of the HDD platter since the fly height of the HDD is set in nanometers which is an order of magnitude higher off of the platter surface than any ejecta created. The same technique is used to cut the center knockout hole in the platter.

A method of producing glass hard disk drive platters from a substrate using laser machining, proceeds with the following steps:

providing a planar glass substrate with a layered system of magnetic media coatings or uncoated substrate;

providing a laser beam comprising a burst of laser pulses;

providing a laser beam delivery system capable of focusing the laser beam onto the planar glass substrate and to enable relative movement between the laser beam and the planar glass substrate;

focusing the laser beam relative to the planar glass substrate to form a beam waist at a location that is external to the planar glass substrate, wherein the laser pulses incident on the surface of the planar glass substrate are focused such that a sufficient energy density is maintained within the planar glass substrate to form a continuous laser filament there through without causing optical breakdown;

laser ablating of the magnetic media coatings on the top surface of the planar glass substrate followed by creating a laser filament that cuts completely through the glass substrate by photoacoustic compression and laser ablates or vaporizes the magnetic media coatings on the bottom surface of the planar glass substrate;

enabling relative movement between the focused laser beam and the planar glass substrate so as to move the laser filament created in the planar glass substrate, with the laser beam delivery system in circular geometric patterns relative to the planar top surface of the glass substrate so as to cut circular platters from said planar glass substrate.

If necessary, depending upon the quality of the laser and the precision and accuracy of the laser beam delivery system, the platter may require additional buffing, polishing and verification of the platter's surface smoothness.

As discussed herein, the circular pattern need not be cut at 90 degrees to the planar top or bottom surface of the glass substrate as it may be cut angularly by manipulation of the relationship between the laser beam and the glass substrate.

Uncoated substrates are cleaved, cleaned and then coated to form platters. The disks might be used for purposes other than hard disks wherein they have different coatings. As an example, some applications in fabricating include variable wheel filters coated on the disk, or some other biological applications that need a flat platter for rotation. Still further, it is possible that the flat platters are further characterized in subsequent processing steps of biological applications. The further characterization may include adding features to the surface of the flat platters for the biological applications.

Figure 27:
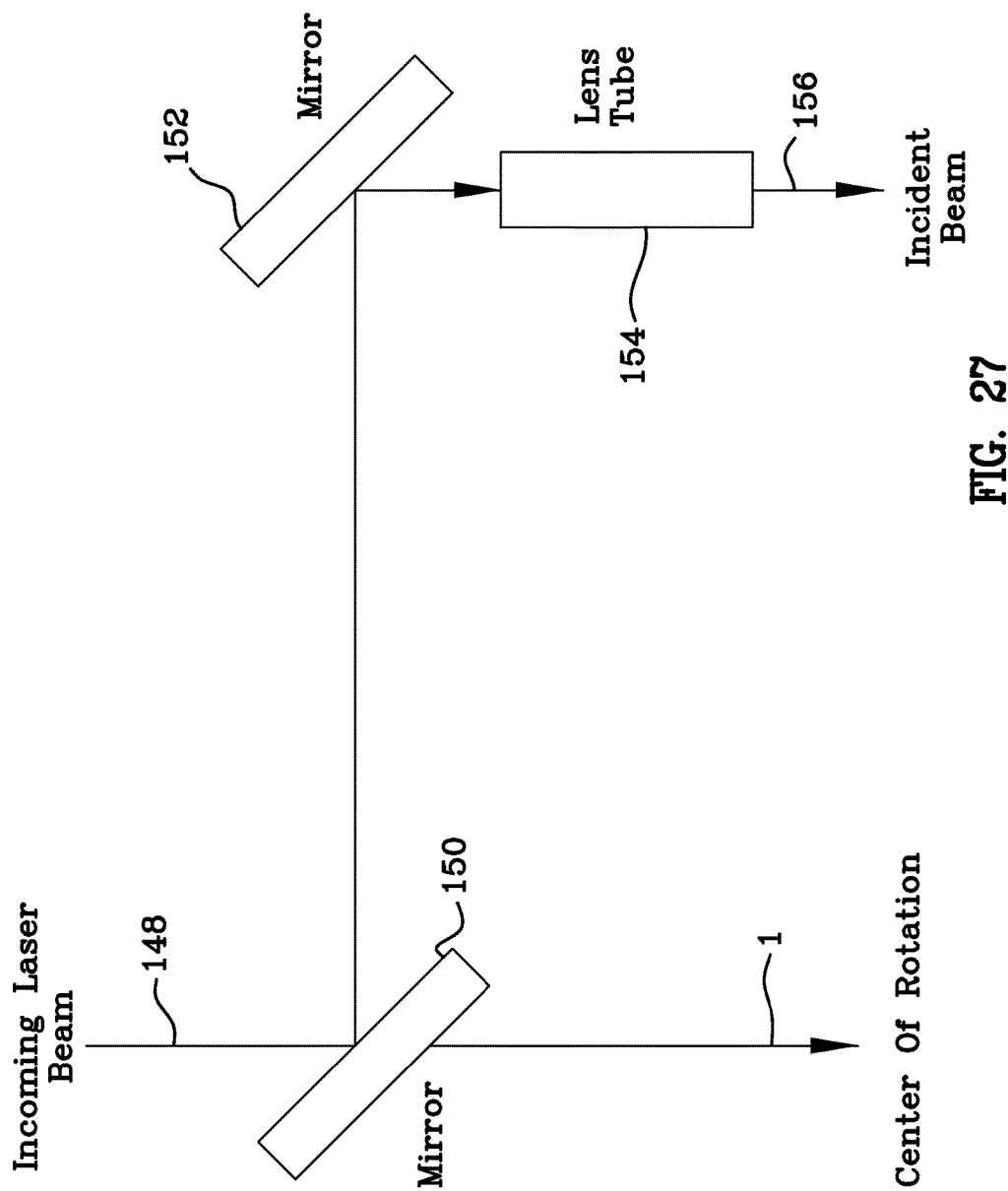
FIG. 27 shows a mechanical configuration of the laser machining system that cuts a single circle in a target material; and, FIG. 28 shows a glass substrate from which glass hard disk drive platters are cut as illustrated in FIGS. 25A and 25B.

Referring to FIG. 27, is an example of a mechanical configuration of the laser machining system beam steering equipment adapted for cutting a single circle in a target material can best be seen. The laser machining system produces an incoming laser beam 148 that is directed/steered by first mirror 150 perpendicular to its axis, onto second mirror 152 that steers the laser beam parallel to the axis of the incoming beam 148 and through a lens focusing device such as a lens tube 154, wherein it exits as an incident beam 156 that is projected onto the substrate (either parallel or at an acute angle.) As can be seen, the center of rotation has an axis that would be an extension of the axis of the incoming laser beam 148 before it struck the first mirror 150. Both mirrors and the lens tube are rotated about the center of rotation so as to scribe a circle on the planar substrate. To change the diameter of the circle scribed requires but a relocation of the second mirror 152 and the lens tube 154.

It is to be understood that the invention is not limited in its application to the arrangements of the components set forth in the following description or illustrated in the drawings. The invention is capable of other embodiments and of being practiced and carried out with various different ordered steps. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A method of producing glass hard disk drive platters using laser machining, comprising the steps of:
    providing a planar glass substrate;
    providing a laser beam comprising bursts of laser pulses;
    providing a laser beam delivery system, said laser beam delivery system includes a distributive focusing assembly, said distributive focusing assembly creating a principal focal waist and at least one secondary focal waist;
    focusing said laser beam along a longitudinal axis onto said planar glass substrate and enabling relative movement between said laser beam and said planar glass substrate;
    each burst of said laser pulses in said distributively focused laser beam having sufficient fluence to initiate self-focusing of said laser beam generating a laser filament, said focused laser beam maintaining sufficient fluence to propagate said laser filament completely through said planar glass substrate, each laser filament forming a pathway of compressed material about said longitudinal axis within said planar glass substrate; and,
    moving said focused laser beam relative to said planar glass substrate in circular geometric patterns, said bursts of laser pulses creating an outer scribed circular line and an inner scribed circular line of filament arrays, thereby cutting circular hard disk drive platters from said planar glass substrate.

2. The method of producing glass hard disk drive platters using laser machining as claimed in claim 1, wherein said principal focal waist is formed at a location external to said planar glass substrate.

3. A method of producing glass hard disk drive platters using laser machining as claimed in claim 2, wherein each burst of laser pulses includes 2-50 pulses.

4. The method of producing glass hard disk drive platters using laser machining as claimed in claim 1, wherein the total amount of pulse energy or fluence applied to said planar glass substrate at a spot where said focused laser beam contacts said planar glass substrate is lower than the threshold critical energy level required to initiate ablative machining.

5. A method of producing glass hard disk drive platters using laser machining as claimed in claim 4, wherein each burst of laser pulses includes 2-50 pulses.

6. The method of producing glass hard disk drive platters using laser machining as claimed in claim 1, wherein said laser beam delivery system is:
    radially adjustable enabling said outer scribed circular line to be cut in and through said glass substrate; and,
    radially adjustable enabling said inner scribed circular line to be cut in and through said glass substrate.

7. A method of producing glass hard disk drive platters using laser machining as claimed in claim 6, wherein each burst of laser pulses includes 2-50 pulses.

8. A method of producing glass hard disk drive platters using laser machining as claimed in claim 1, wherein each burst of laser pulses includes 2-50 pulses.

* * * * *